(12) United States Patent
Fouda et al.

(10) Patent No.: US 10,725,194 B2
(45) Date of Patent: Jul. 28, 2020

(54) ELECTROMAGNETIC (EM) DEFECT DETECTION METHODS AND SYSTEMS WITH ENHANCED INVERSION OPTIONS

(71) Applicant: Halliburton Energy Services, Inc., Houston, TX (US)

(72) Inventors: Ahmed E. Fouda, Houston, TX (US); Burkay Donderici, Houston, TX (US); Luis Emilio San Martin, Houston, TX (US); Daniel Viassolo, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/755,470

(22) PCT Filed: May 12, 2016

(86) PCT No.: PCT/US2016/032212
§ 371 (c)(1),
(2) Date: Feb. 26, 2018

(87) PCT Pub. No.: WO2017/196357
PCT Pub. Date: Nov. 16, 2017

(65) Prior Publication Data
US 2018/0172872 A1 Jun. 21, 2018

(51) Int. Cl.
*G01V 3/28* (2006.01)
*E21B 47/10* (2012.01)
(Continued)

(52) U.S. Cl.
CPC ............. *G01V 3/28* (2013.01); *E21B 47/092* (2020.05); *E21B 47/10* (2013.01); *G01V 3/12* (2013.01)

(58) Field of Classification Search
CPC ........ E21B 47/0905; E21B 47/10; G01V 3/12
See application file for complete search history.

(56) References Cited

U.S. PATENT DOCUMENTS

| 4,292,589 A | 9/1981 | Bonner |
| 8,958,989 B2 | 2/2015 | Legendre et al. |

(Continued)

FOREIGN PATENT DOCUMENTS

| WO | 2016032498 | 3/2016 |
| WO | 2016046857 | 3/2016 |

OTHER PUBLICATIONS

"Multi-tubular corrosion inspection using a pulsed eddy current" by Rourke et al., IPTC 16645, dated 2013.
(Continued)

*Primary Examiner* — Alvaro E Fortich
(74) *Attorney, Agent, or Firm* — John Wustenberg; C. Tumey Law Group PLLC

(57) ABSTRACT

A method includes deploying an electromagnetic (EM) defect detection tool in a borehole having one or more tubular strings. The method also includes collecting measurements by the EM defect detection tool as a function of measured depth or position. The method also includes using the measurements and a first inversion process to determine a defect in the one or more tubular strings. The first inversion process involves a cost function having a misfit term and having a stabilizing term with nominal model parameters. The method also includes performing an operation in response to the determined defect.

18 Claims, 18 Drawing Sheets

(51) Int. Cl.
*G01V 3/12* (2006.01)
*E21B 47/092* (2012.01)

(56) References Cited

U.S. PATENT DOCUMENTS

| | | | |
|---|---|---|---|
| 9,557,439 | B2 | 1/2017 | Wilson et al. |
| 9,562,877 | B2 | 2/2017 | Amineh et al. |
| 9,562,988 | B2 | 2/2017 | Wilson et al. |
| 9,664,816 | B2 | 5/2017 | Donderici et al. |
| 2005/0088181 | A1* | 4/2005 | Barber .................... G01V 3/28 324/346 |
| 2008/0170467 | A1 | 7/2008 | Barolak |
| 2008/0281667 | A1 | 11/2008 | Chen et al. |
| 2009/0005993 | A1* | 1/2009 | Abubakar .............. G01V 11/00 702/7 |
| 2010/0118648 | A1 | 5/2010 | Zhao |
| 2013/0080058 | A1* | 3/2013 | Wu ........................ G06F 19/00 702/7 |
| 2015/0112598 | A1* | 4/2015 | Kherroubi ................ G01V 3/20 702/11 |
| 2015/0346384 | A1* | 12/2015 | Kalyanaraman .... E21B 47/0005 702/6 |
| 2015/0369031 | A1* | 12/2015 | Yang ........................ E21B 4/02 700/275 |
| 2016/0252644 | A1 | 9/2016 | Fouda et al. |
| 2016/0290122 | A1 | 10/2016 | San Martin et al. |
| 2017/0101865 | A1 | 4/2017 | Amineh et al. |
| 2017/0115426 | A1 | 4/2017 | San Martin et al. |
| 2017/0138905 | A1 | 5/2017 | Amineh et al. |
| 2017/0248730 | A1 | 8/2017 | San Martin et al. |

OTHER PUBLICATIONS

"Scanning for downhole corrosion" by Acuna et al., Oilfield Review 22, No. 1:42-50 published in 2010.
International Search Report and Written Opinion for Application No. PCT/US2016/032212 dated Jan. 3, 2017.

* cited by examiner

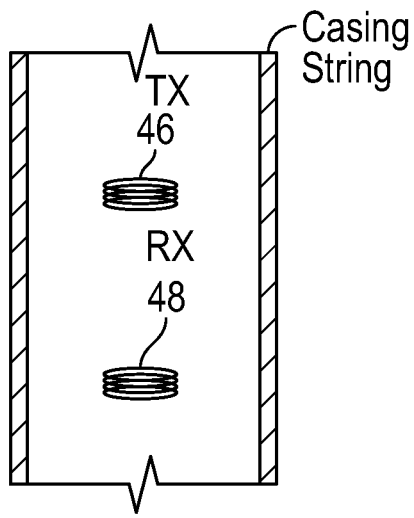
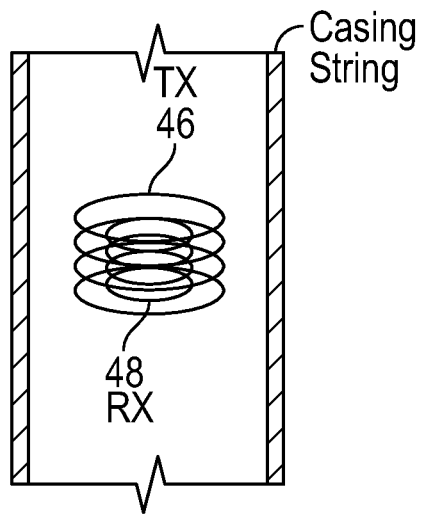
FIG. 2A  FIG. 2B
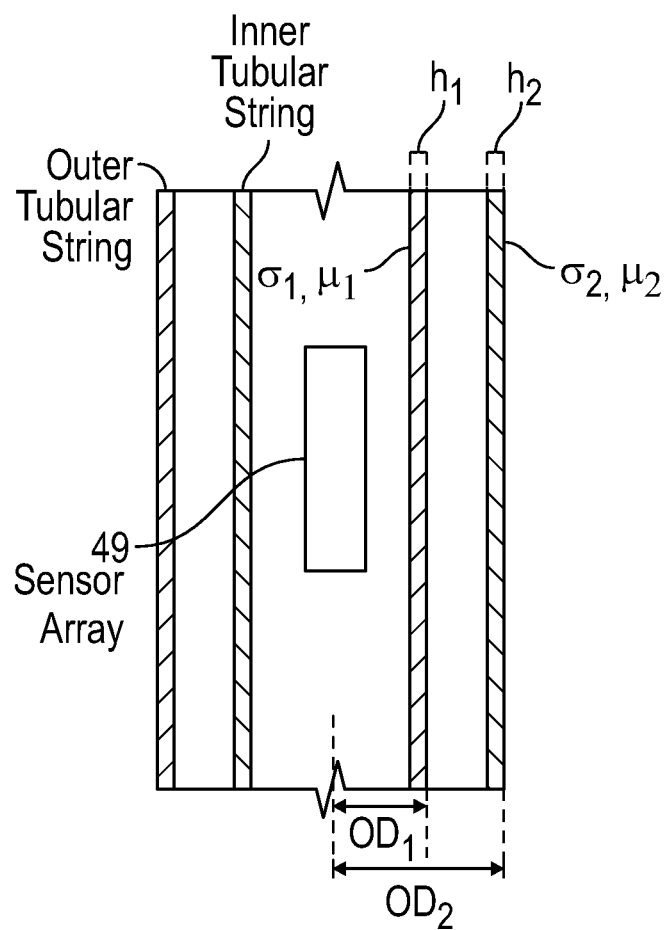
FIG. 3

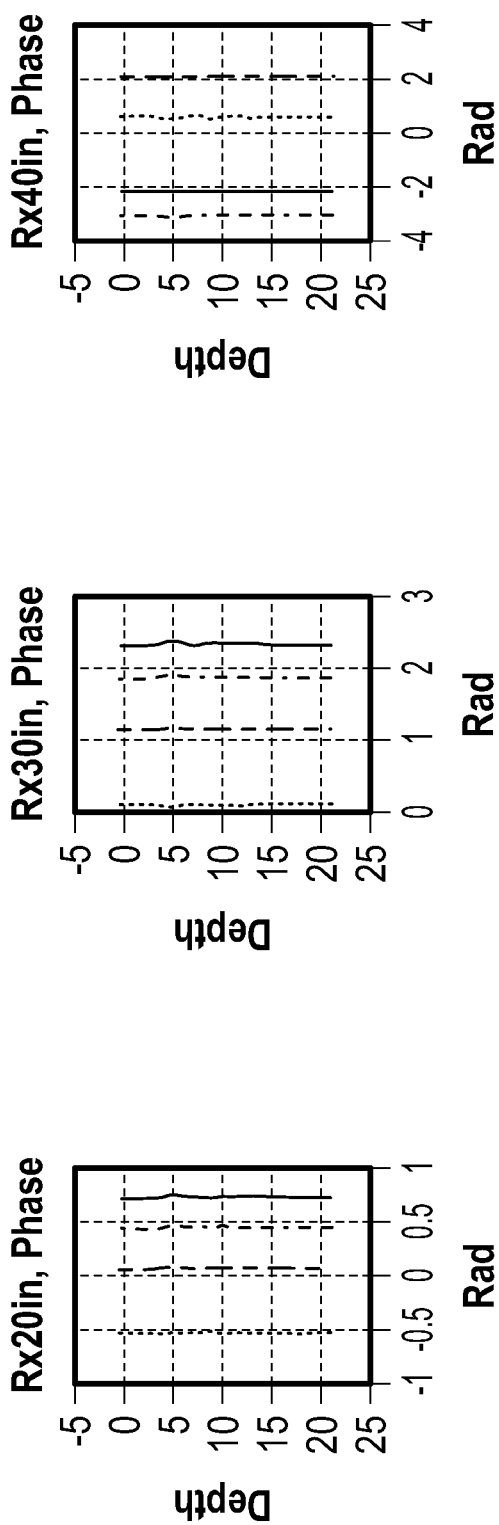
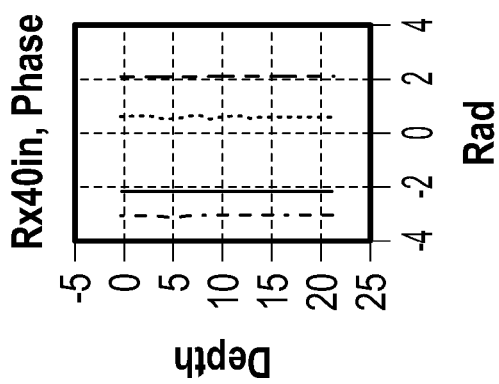
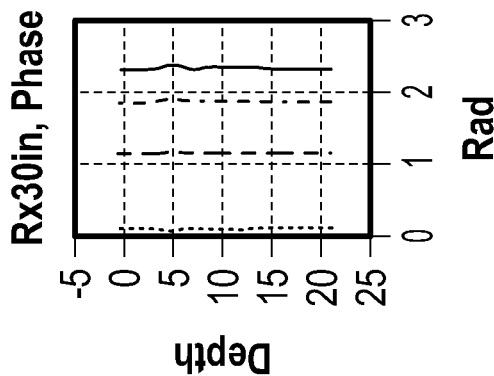
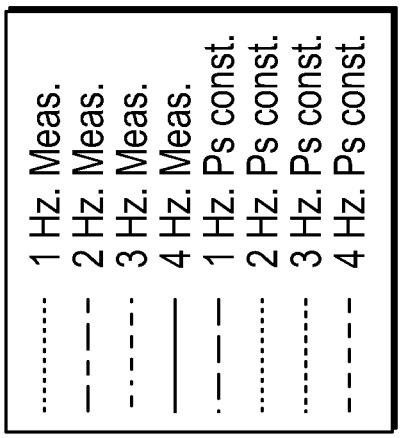
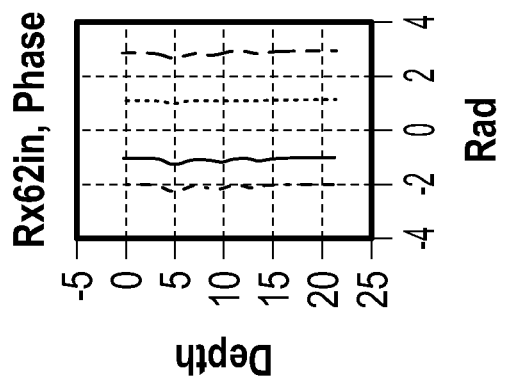
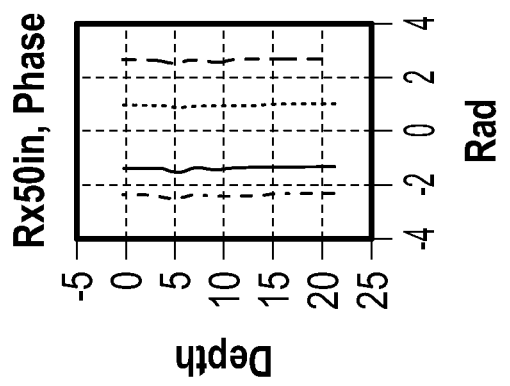
FIG. 9F  FIG. 9G  FIG. 9H  FIG. 9I  FIG. 9J

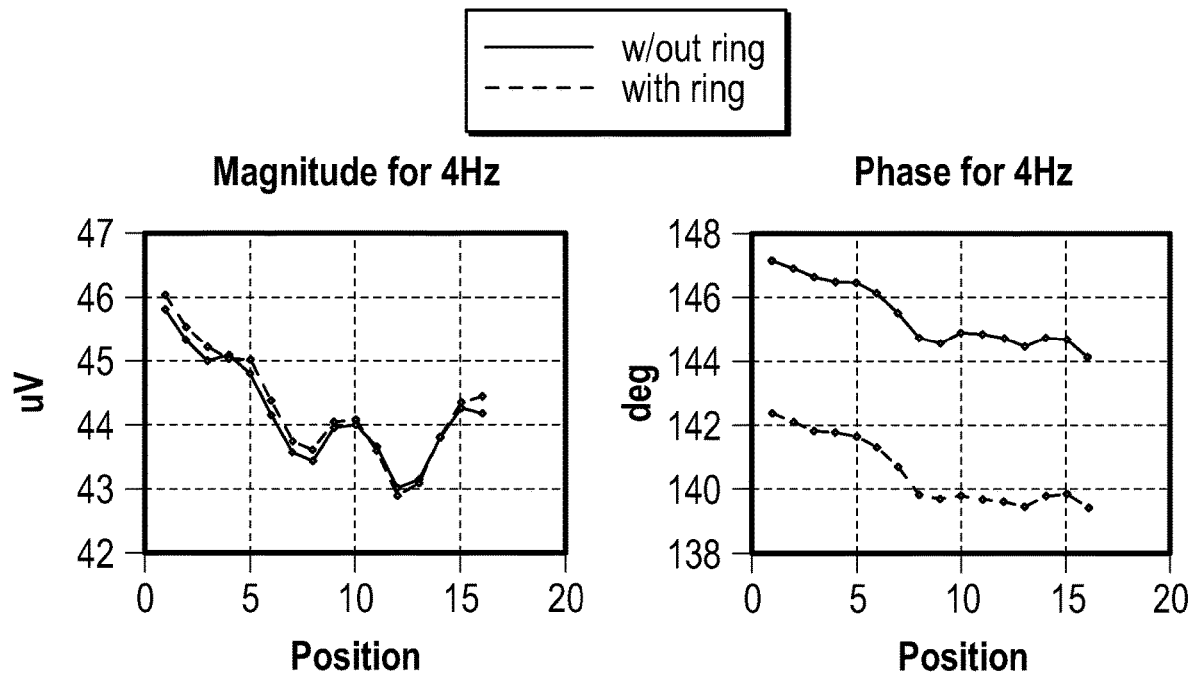
FIG. 12A
FIG. 12B
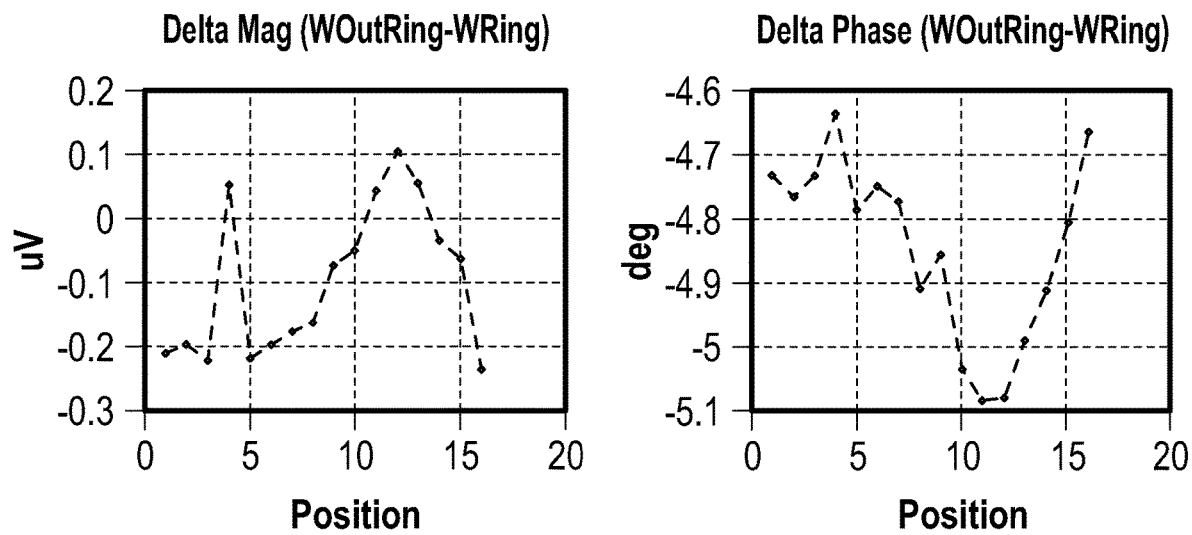
FIG. 12C
FIG. 12D

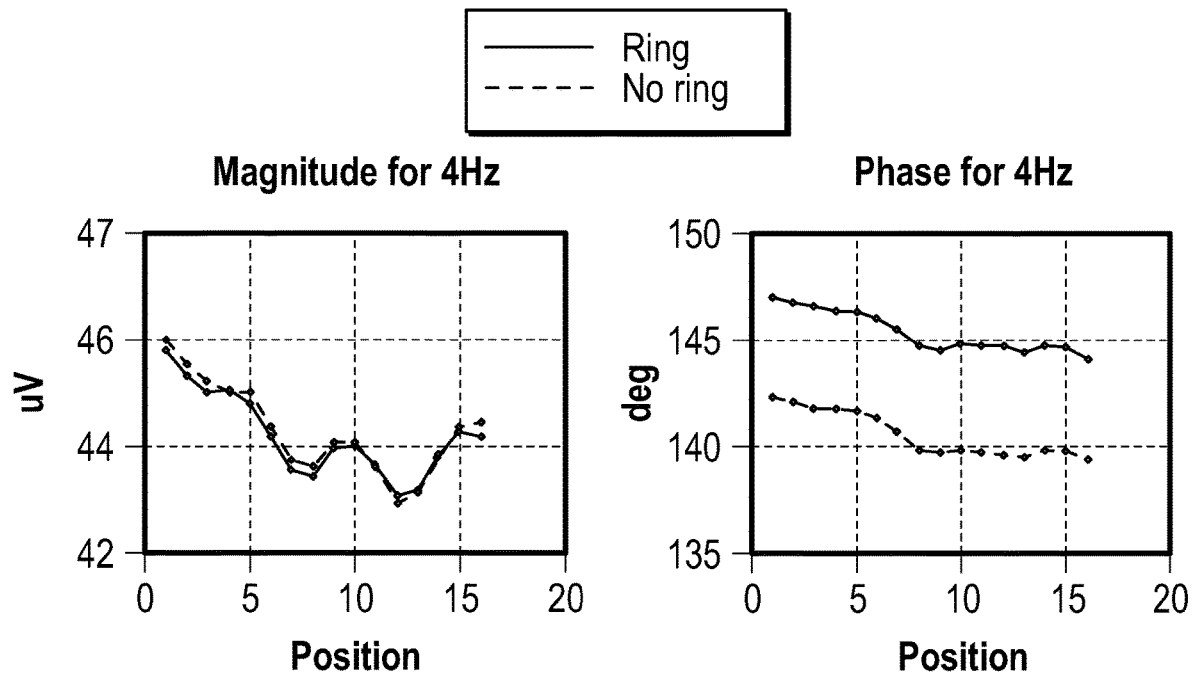
FIG. 13A
FIG. 13B
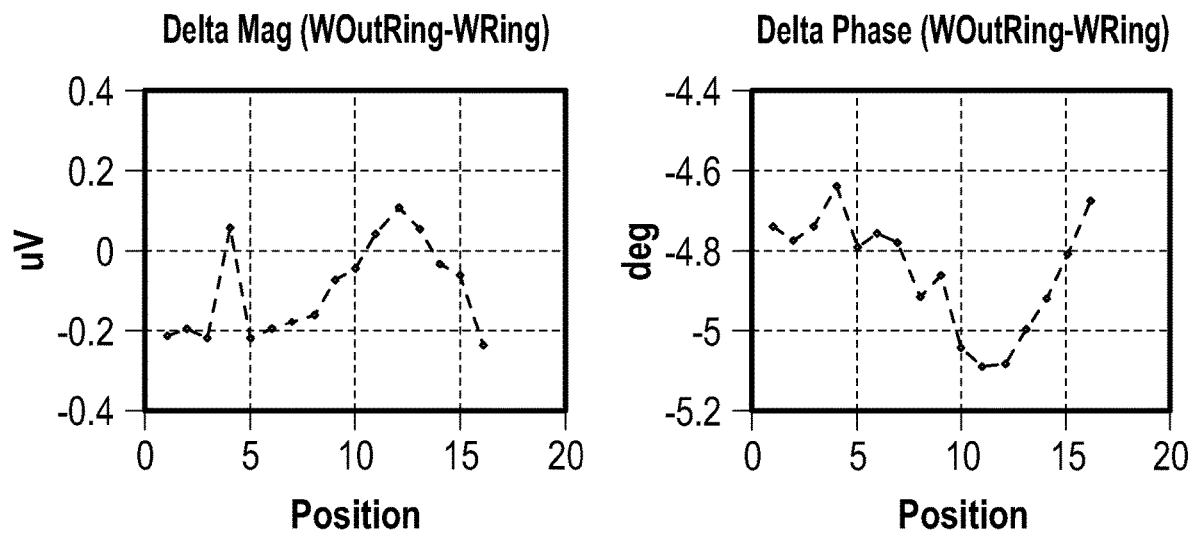
FIG. 13C
FIG. 13D

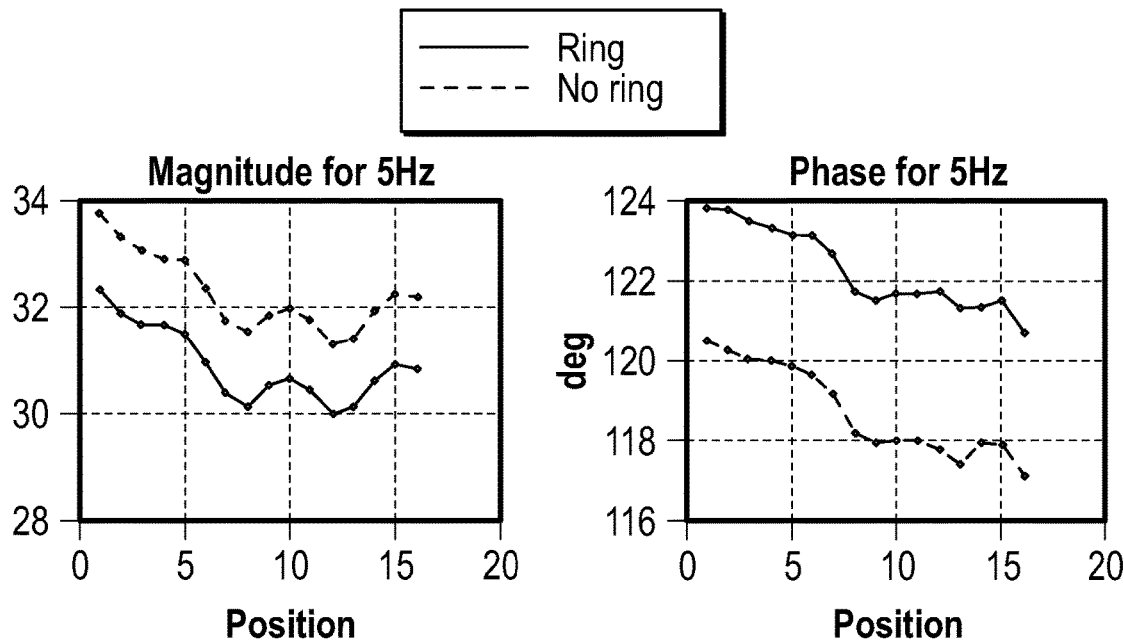
FIG. 13E
FIG. 13F
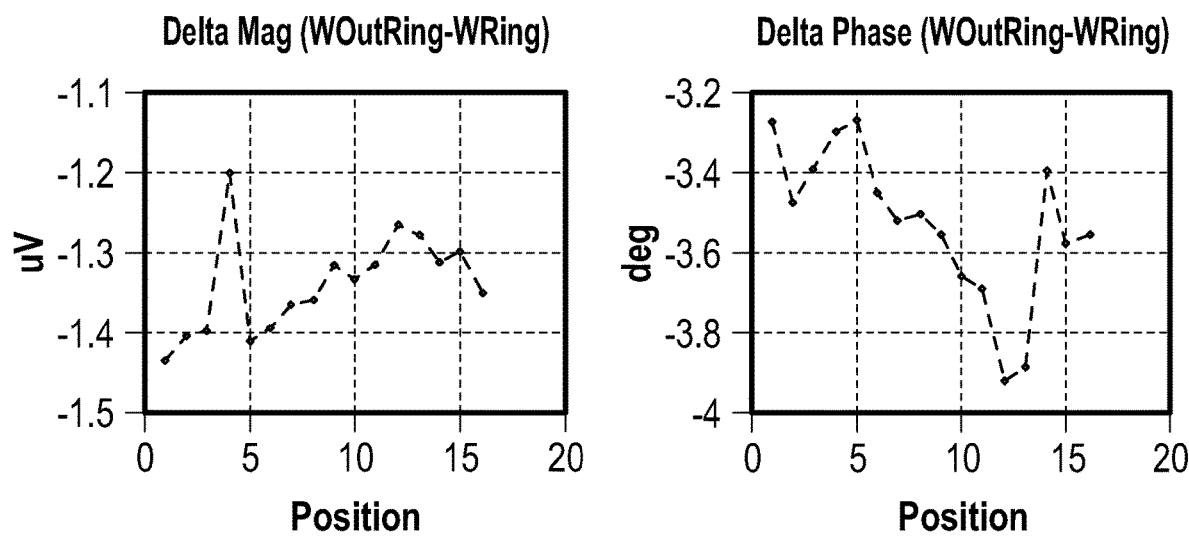
FIG. 13G
FIG. 13H

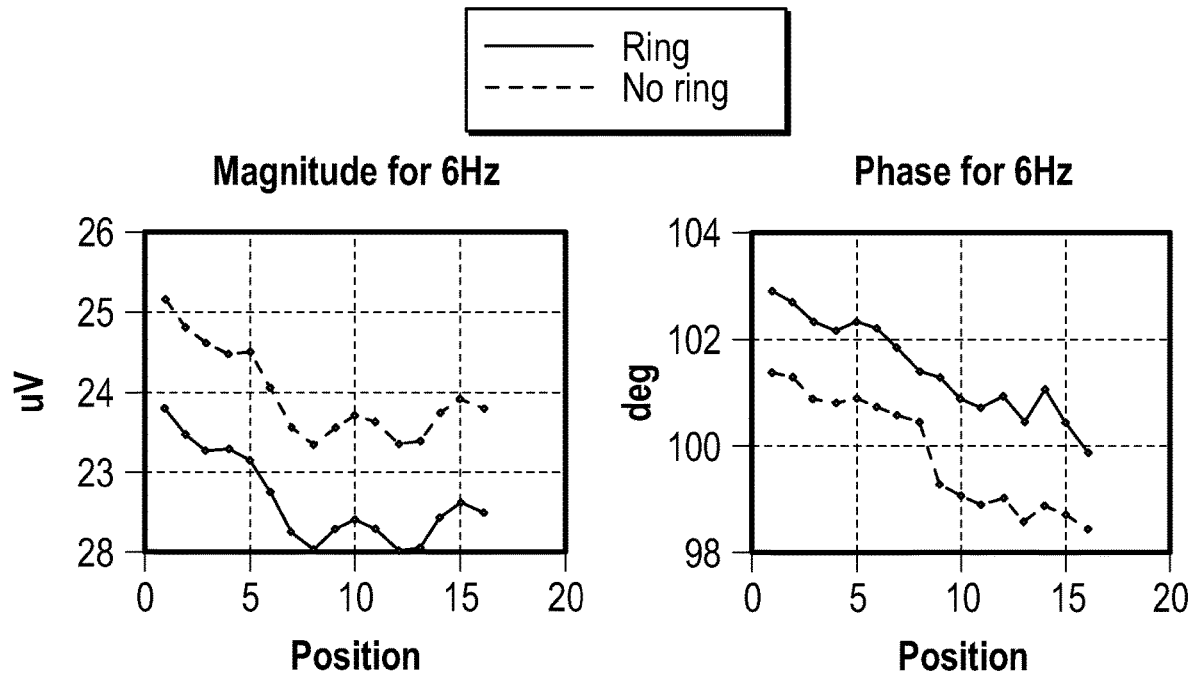
FIG. 13I
FIG. 13J
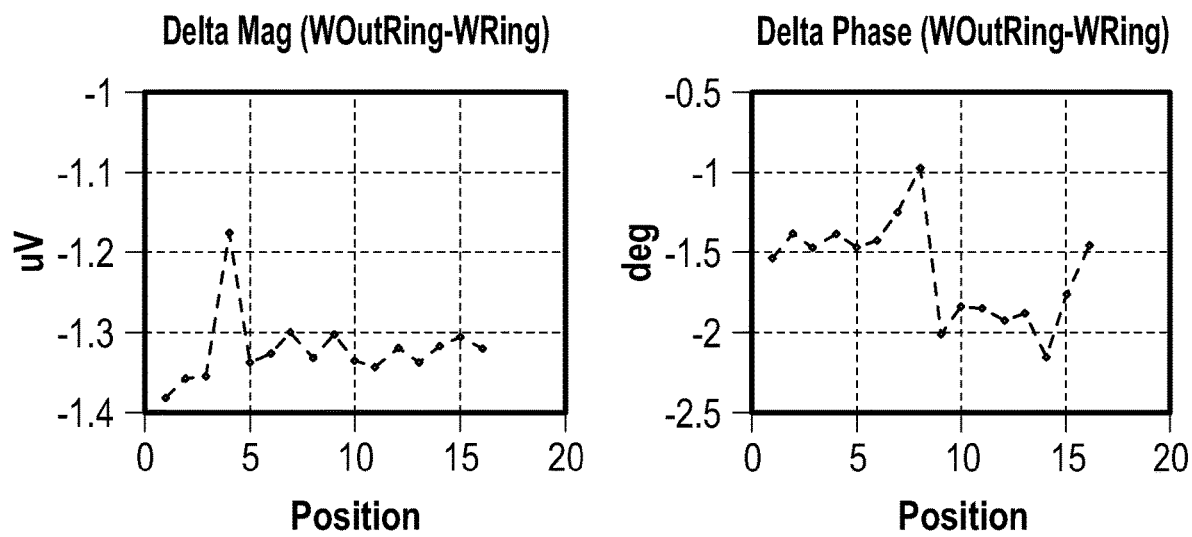
FIG. 13K
FIG. 13L

നnot visible

ELECTROMAGNETIC (EM) DEFECT DETECTION METHODS AND SYSTEMS WITH ENHANCED INVERSION OPTIONS

BACKGROUND

For oil and gas exploration and production, a network of wells installations and other conduits are established by connecting sections of metal tubulars together. For example, a well installation may be completed, in part, by lowering multiple sections of metal tubulars or pipes (i.e., a casing string) into a borehole, and cementing the casing string in place. In some well installations, multiple casing strings are employed (e.g., a concentric multi-string arrangement) to allow for different operations related to well completion, production, or enhanced oil recovery (EOR) options.

Corrosion of metal tubulars is an ongoing issue. Efforts to mitigate corrosion include use of corrosion-resistant alloys, coatings, treatments, corrosion transfer, etc. Also, efforts to improve corrosion monitoring are ongoing. For downhole casing strings, various types of corrosion monitoring tools are available. One type of corrosion detection tool uses electromagnetic (EM) fields to estimate tubular thickness or other corrosion indicators. As an example, an EM logging tool may collect EM log data, where the EM log data can be interpreted to correlate a level of flux leakage or EM induction with corrosion. Obtaining meaningful EM field measurements and interpreting these measurements is an ongoing challenge, especially for multi-tubular scenarios.

BRIEF DESCRIPTION OF THE DRAWINGS

Accordingly, there are disclosed in the drawings and the following description electromagnetic (EM) defect detection methods and systems with enhanced inversion options. In the drawings:

FIGS. 2A and 2B are diagrams showing illustrative transmitter/receiver configurations for an EM defect detection tool;

FIG. 3 is a diagram showing a multi-casing string model with related attributes;

FIGS. 9A-9J shows illustrative measured versus reconstructed response charts for different receivers in the example EM defect detection scenario;

FIGS. 12A-12D are diagrams showing magnitude and phase responses for the same test receiver and another frequency;

Figure 1A:
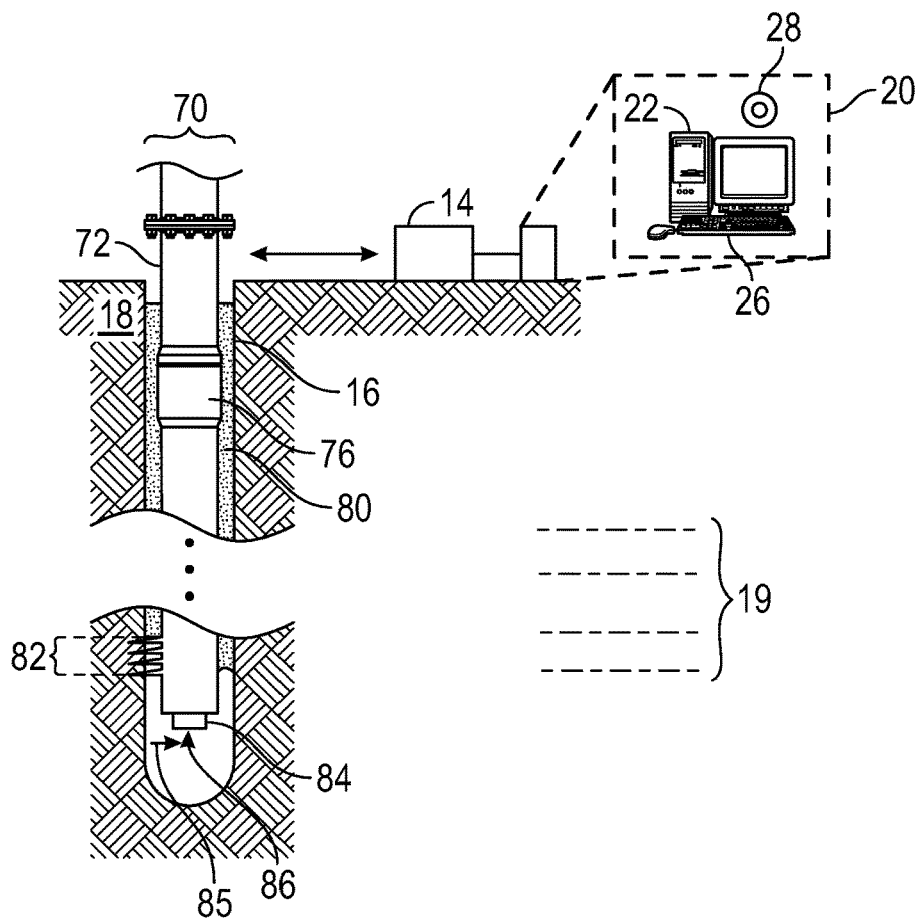
FIGS. 1A and 1B are diagrams showing illustrative borehole survey environments.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Described herein are methods and systems for electromagnetic (EM) defect detection methods and systems with enhanced inversion options. In at least some embodiments, a first inversion option employs a cost function having a misfit term and having a stabilizing term with nominal model parameters to detect a defect in one or more downhole tubular strings. As used herein, the term "nominal model parameters" refers to the best a priori knowledge of non-defected pipe parameters before measurements are made. In one embodiment, parameters associated with the well construction plan may be used as the nominal model parameters. Thickness measurement from another tool in non-defected sections may also be used as the nominal model parameters.

In at least some embodiments, the cost function for the first inversion option includes a linear combination of the misfit term and the stabilizing term. More specifically, the misfit term may include a weighted difference between a calibrated version of measurements collected by an EM defect detection tool and predicted measurements. Meanwhile, the stabilizing term may include a weighted difference between model parameters and nominal model parameters. Further, the first inversion process may minimize the cost function subject to constraints for tubular thickness and relative permeability. Additional details of an example cost function the first inversion process are given hereafter. In at least some embodiments, the first inversion option involves radial one-dimensional (RID) processing. In an RID inversion, the thickness of one or more tubular strings as a function of time is determined. After the "function of time" data is collected, the time data is processed to create values of thicknesses as function of position or measured depth. The thickness as a function of measured depth can be indicative of a defect (e.g., corrosion) along a tubular string. As another example, EM properties of a tubular string as a function of measured depth may be determined, where the EM properties as a function of measured depth can be indicative of a defect along a tubular string.

In response to a determined defect, one or more operations can be performed. For example, an output device may display a representation of any determined defects using alphanumeric characters, geometric shapes and/or images. Additionally or alternatively, determined defects can be used to adjust one or more devices performing downhole operations. For example, flow control devices (e.g., a valve) in a well can be adjusted based on a determined defect. Additionally or alternatively, one or more devices that perform well intervention operations (e.g., to repair a tubular string in a well) can be deployed or initiated based on a determined defect. In different embodiments, the operations performed in response to the determine defect may include downhole operations and/or operations at earth's surface. The EN defect detection tool itself or components included with the EM defect detection tool may respond to a determined defect by performing one or more operations (e.g., telemetry operations or repair operations).

In at least some embodiments, a second inversion option uses measurements collected by an EM defect detection tool as well as prior defect test results or a model obtained from prior defect test results (e.g., test measurements involving known defects and test scenarios) to determine a defect in one or more tubular strings. For example, the collected measurements may be compared to prior defect test results to identify matches or correlations between the collected measurements and the prior defect test results. Such matches or correlations can be used to determine a defect. Additionally or alternatively, a model obtained from prior defect test results can be used to determine defects. An example model may, for example, estimate tubular thickness or a change in tubular thickness as a function of magnitude responses and/or phase responses at one or more frequencies. Additional details regarding the second inversion process are given hereafter.

In at least some embodiments, the results of the first and second inversion processes can be combined to determine a defect in one or more downhole tubular strings. When combined, the results of the different inversion options can be weighted the same or can be weighted differently. Additionally or alternatively, a confidence value for results of the first inversion process can be determined based on results of the second inversion process or vice versa. A representation of any defects as well as any related confidence values can be displayed by an output device (e.g., a printer or computer monitor) to a user. The representation of the defect may correspond to an image and/or alphanumeric characters (e.g., words and numbers to identify the position and size of the defect).

In at least some embodiments, an example method includes deploying an EM defect detection tool in a borehole having one or more tubular strings. The method also includes collecting measurements by the EM defect detection tool at different points along the borehole. The method also includes using the collected measurements and a first inversion process to determine a defect in the one or more tubular strings, where the first inversion process involves a cost function having a misfit term and having a stabilizing term with nominal model parameters. The method also includes performing an operation in response to the determined defect.

Meanwhile, in at least some embodiments, an example system includes an EM defect detection tool deployed in a borehole having one or more tubular strings to collect measurements at different points along the borehole. The system also includes a processing unit that uses the collected measurements and a first inversion process to determine a defect in the one or more tubular strings, where the first inversion process involves a cost function having a misfit term and having a stabilizing term with nominal model parameters. The system also includes a device that performs an operation in response to the determined defect. Various EM defect detection tool options, inversion options, measurement processing options, and defect detection response options are disclosed herein.

Figure 1B:
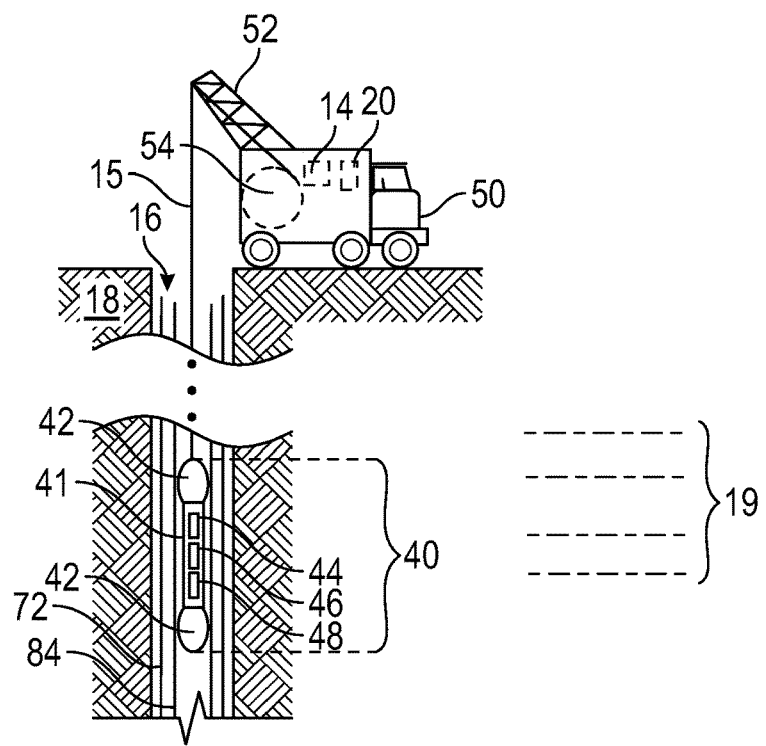

To provide some context for the disclosure, FIGS. 1A and 1B show illustrative multi-string survey environments. In FIG. 1A, a permanent well 70 is installed, for example, using a drilling rig to drill a borehole 16 that penetrates formations 19 of the earth 18. As shown, a casing string 72 is positioned in the borehole 16. The casing string 72 for well 70 includes multiple tubular casing sections (usually about 30 feet long) connected end-to-end by couplings 76. It should be noted that FIG. 1A is not to scale, and that casing string 72 typically includes many such couplings 76. The well 70 includes cement slurry 80 that has been injected into the annular space between the outer surface of the casing string 72 and the inner surface of the borehole 16 and allowed to set. As represented in FIG. 1A, a production tubing string 84 is positioned in an inner bore of the casing string 72. Both the casing string 72 and the production tubing string 84 are formed from multiple segments of metal tubulars and are subject to corrosion.

In FIG. 1A, the well 70 corresponds to a production well and is adapted to guide a desired fluid (e.g., oil or gas) from a bottom of the borehole 16 to a surface of the earth 18. For example, perforations 82 may be formed at a bottom of or along the borehole 16 to facilitate the flow of a fluid 85 from a surrounding formation into the borehole 16 and thence to earth's surface via an opening 86 at the bottom of the production tubing string 84. Note that well configuration of FIG. 1A is illustrative and not limiting on the scope of the disclosure. Other examples of permanent well installations include injection wells and monitoring wells. As desired, well 70 may include other tubular strings in addition to or instead of casing string 72 and production tubing string 84.

In the multi-string EM field survey environment of FIG. 1A, uplink or downlink information is transferred between an EM defect detection tool (see e.g., FIG. 1B) and a surface interface 14 and/or computer system 20. In some embodiments, the surface interface 14 and/or the computer system 20 may perform various operations such as converting signals from one format to another, storing EM log data collected by an EM logging tool, and/or processing EM log data to determine casing string attributes as described herein. In at least some embodiments, the computer system 20 includes a processing unit 22 that performs the EM log data analysis operations by executing software or instructions obtained from a local or remote non-transitory computer-readable medium 28. The computer system 20 also may include input device(s) 26 (e.g., a keyboard, mouse, touch-pad, etc.) and output device(s) 24 (e.g., a monitor, printer, etc.). Such input device(s) 26 and/or output device(s) 24 provide a user interface that enables an operator to interact with an EM logging tool and/or software executed by the processing unit 22. For example, the computer system 20 may enable an operator to select analysis options, to view collected EM log data, to view analysis results, and/or to perform other tasks. While the computer system 20 is represented at earth's surface, another option is to perform some or all processing operations related to detecting a defect downhole (e.g., by processing components of an EM detect detection tool).

In different embodiments, an EM detect detection tool can be conveyed to a multi-string survey environment (e.g., the downhole environment of FIG. 1A) using wireline, slick line, coiled tubing, a casing string, wired pipe, or combinations thereof. For deployment options that do not provide power to the EM defect detection tool (e.g., powerless slick line, coiled tubing, or casing string), the EM defect detection tool may include a remote power source (e.g., a battery or other remote power source) to power the antennas or other electronics.

FIG. 1B illustrates a wireline logging environment in which an EM defect detection tool 40 is positioned within production tubing string 84 and casing string 72. In FIG. 1B, the EM defect detection tool 40 is suspended in borehole 16 that penetrates formations 19 of the earth 18. For example, the EM defect detection tool 40 may be suspended by a cable 15 having conductors and/or optical fibers for conveying power to the EM defect detection tool 40. The cable 15 may also be used as a communication interface for uphole and/or downhole communications. In at least some embodiments, the cable 15 wraps and unwraps as needed around cable reel 54 when lowering or raising the EM defect detection tool 40. As shown, the cable reel 54 may be part of a movable logging facility or vehicle 50 having a cable guide 52. Other conveyance options (e.g., slick line, coiled tubing, a casing string, wired pipe, or combinations) may use other techniques and components to convey the EM defect detection tool 40 along a multi-tubular survey environment.

The EM defect detection tool 40 may include stabilizers 42 on one or more ends (e.g. opposite ends) of a tool body 41 to centralize the EM defect detection tool 40 within the production tubing string 84. The tool body 41 of the EM logging tool 40 houses or provides a support structure for control electronics 44, transmitter(s) 46, and receiver(s) 48. In operation, transmitter(s) 46 are directed by the control electronics 44 to generate a time-varying EM field whose flux is guided by the production tubing string 84 and/or casing string 72. Due to induced eddy currents, the flux guide provided by the production tubing string 84 and/or casing string 72 is lossy, but will still induce a voltage in receiver(s) 48. The control electronics 44 stores the voltages recorded by receiver(s) 48 to form an EM data log, which may be correlated with geometrical, electrical, and/or magnetic attributes of the production tubing string 84 and/or casing string 72. For example, corrosion or other defects in the production tubing string 84 and/or casing string 72 affects their geometrical, electrical, and/or magnetic attributes and can therefore be estimated from analysis of the EM log data. The control electronics 44 may also include a communication interface to transmit the EM data log to earth's surface. Additionally or alternatively, the EM data log obtained by the EM defect detection tool 40 can be stored and accessed later once the tool 40 reaches earth's surface.

At earth's surface, the surface interface 14 receives the EM data log via the cable 15 and conveys the EM field measurements to a computer system 20. Again, the interface 14 and/or computer system 20 (e.g., part of the movable logging facility or vehicle 50) may perform various operations such as converting signals from one format to another, storing the EM log data, and/or analyzing the EM log data to determine casing string attributes.

FIGS. 2A and 2B show illustrative transmitter/receiver configurations for an EM defect detection tool (e.g., tool 40). In FIG. 2A, transmitter 46 and receiver 48 are positioned within a casing string (e.g., strings 72 or 84) and are separated. Meanwhile, in FIG. 2I, transmitter 46 and receiver 48 are positioned within a casing string (e.g., strings 72 or 84) and are collocated. For example, transmitter 46 and receiver 48 may correspond to coils or solenoids, where the receiver 48 is positioned inside the transmitter 46, or vice versa. While only one transmitter 46 and one receiver 48 are shown in FIGS. 2A and 2B, it should be understood that EM defect detection tools such as tool 40 may have a plurality of sensor arrays, where the distance between transmitters 46 and receivers 48 for different sensor arrays may vary. The dimensions of the transmitters 46 and receivers 48 may vary for different sensor arrays. Also, the operation of each sensor array may be varied by frequency-domain or time-domain adjustments. Although it is not ideal in terms of electrical performance, the same coil may be used for both transmission and reception.

FIG. 3 shows a multi-string model with related attributes. In FIG. 3, a sensor array 49 (e.g., one or more transmitter/receiver arrays) is positioned within two casing strings (inner and outer casing strings). The sensing array 49 may be part of an EM defect detection tool such as tool 40 to enable various attributes (e.g., tubular wall thickness, conductivity, permeability) of the inner and outer casing strings to be estimated. In the example multi-string scenarios of FIGS. 1A and 1B, the casing string 72 is an outer tubular string, while the production tubing string 84 is an inner tubular string.

In at least some embodiments, RID processing performed downhole and/or at earth's surface is used to calculate multi-string casing attributes. As an example, attributes that may be calculated for the multi-string model of FIG. 3 include inner tubular outer diameter ($OD_1$), inner tubular thickness ($h_1$), inner tubular conductivity ($\sigma_1$), inner tubular permeability ($\mu_1$), outer tubular diameter ($OD_2$), outer tubular thickness ($h_2$), outer tubular conductivity ($\sigma_2$), and outer tubular permeability ($\mu_2$). While only two tubular strings are shown in the multi-string model of FIG. 3, it should be noted that EM log data and multi-string models can be used to determine attributes for more than two tubular strings.

Figure 4:
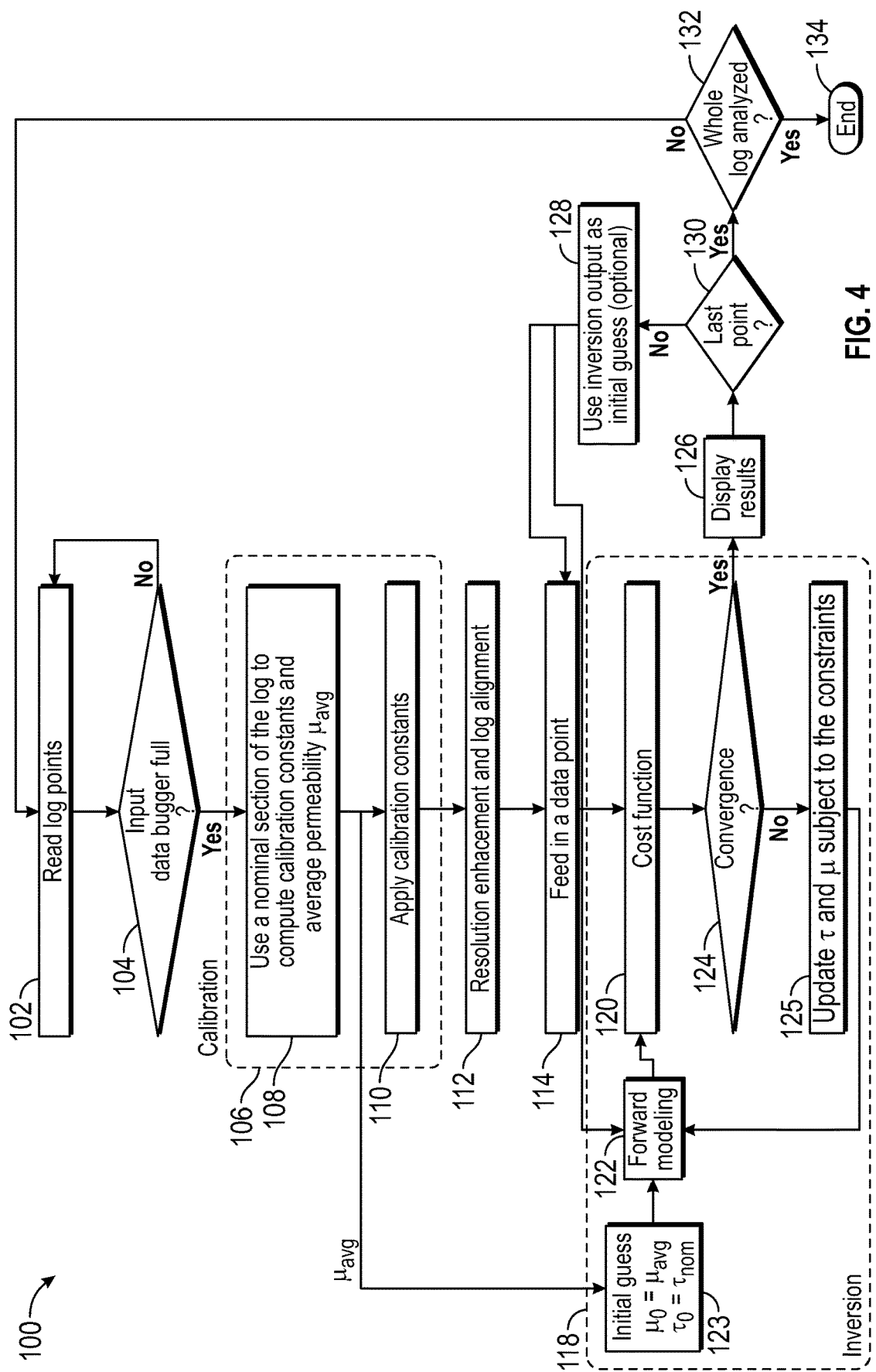
FIG. 4 is a flowchart showing an illustrative method for EM defect detection in downhole tubulars using a first inversion option.

FIG. 4 is a flowchart showing an illustrative method for EM defect detection in downhole tubulars using a first inversion option. In method 100, EM log data points (raw measurements) are read at block 102. The raw measurements are collected, for example, by the EM defect detection tool while deployed in a borehole having one or more tubing strings with different diameters. If the input data buffer that stores the raw measurements is not full (decision block 104), the method 100 returns to block 102. Once the input data buffer is full (decision block 104), the method 100 proceeds to a calibration process 106 that includes using a nominal section of the log to compute calibration constants and average permeability ($\mu_{avg}$) at block 108. At block 110, the calibration constants are applied. In different embodiments, the calibration process 106 can be omitted or modified.

After the calibration process 106, the method 100 proceeds to resolution-enhancement and log alignment at block 112. As an example, the operations of block 112 may include deconvolution, filtering, scaling, and/or other operations.

At block 114, a data point output from block 112 or an inversion output from block 128 is fed into inversion process 118, which corresponds to the first inversion option described herein. For the inversion process 118, the output from block 114 is input to a cost function at block 120. The cost function of block 120 also receives the output of forward modeling block 122 as an input. For the first iteration, the output from the forward modeling block 122 may correspond to initial guesses (block 123) for relative permeability ($\mu_0$) and an initial tubular thickness ($\tau_0$). For example, $\mu_0$ may be set to an average relative permeability ($\mu_{avg}$) and $\tau_0$ may be set to a nominal tubular thickness ($\tau_{norm}$). Another option is to use the output of a previous iteration of the inversion process 118 as the initial guess (e.g., see block 128). If the cost function does not result in convergence (decision block 124), the values for relative permeability and tubular thickness are updated at block 125, and the inversion process 118 is repeated with the updated relative permeability and tubular thickness values as inputs to the cost function of block 120. On the other hand, if the cost function results in convergence (decision block 124), the results for may be displayed at block 126.

Once the last data point has been fed into the inversion process (decision block 130), a determination is made regarding whether the whole log has been analyzed (decision block 132). If the whole log has been analyzed (decision block 132), the method 100 ends at block 134. Otherwise, the method returns to block 102. If additional data points remain (decision block 130), the method 100 returns to block 114.

In at least some embodiments, the inversion process 118 can be described as follows. The inversion starts from an initial guess of the model parameters (thickness and relative permeability of each tubular) and iteratively refines the model parameters to minimize the misfit between measurements and synthetic data. A parametric function (the cost function of block 120) may be formed from the linear combination of a misfit term and a stabilizing term (also known as the regularization term). The misfit term can be formed as the L2 norm of the weighted difference between observed (measured) and predicted (synthetically computed from the model) data. The stabilizing functional can be formed as the L0.5, L1, or L2 norm of the weighted model parameters, and may be inclusive if a priori models and spatial functions.

The model parameters are iteratively adjusted and subject to preset constraints to minimize the parametric functional. Constraints are used to ensure that model parameters output from the inversion process lie within their physical ranges. In each iteration of the minimization process, convergence is checked through pre-defined termination criteria. These criteria may include the following: (a) cost function is less than a specified tolerance; (b) change in model parameters is less than a specified tolerance; (c) change in the cost function is less than a specified tolerance; and (d) and number of iterations exceeded a specified maximum.

Numerical techniques to achieve this minimization may include deterministic methods (e.g., Gauss-Newton, Trust-Region-Reflective, Levenverg-Marquardt, Steepest Descent, Conjugate Gradients) or stochastic methods (e.g., Markov Chain Monte Carlo, Genetic Algorithms, Simulated Annealing). In addition to a final model, the inversion may generate inversion metrics such as misfit/error, data uncertainty estimates, and model uncertainty estimates.

In gradient-based minimization techniques, numerical differentiation is used to compute the gradient (partial derivatives with respect to each one of the model parameters). Analytical differentiation can also be used if analytical expressions relating responses to model parameters are known.

For the first point in the log, the initial guess for tubular thickness is picked as the nominal thickness, and the initial guess for tubular permeability is picked as the average permeability estimated from the calibration process 106. Further, the conductivity of the tubulars may be selected based on prior knowledge of the type of steel used to make the tubulars. Discrepancies between model conductivity and that of real tubulars will be accounted for by the effective permeability of the tubulars estimated in the calibration step. For subsequent points, the inversion result for one point can be used as the initial guess to the next. This helps to smooth non-physical abrupt changes in the inverted log. The process is repeated until the whole buffer is processed. A new buffer is then stacked and the inversion process 118 is repeated until the whole log is processed.

In different embodiments, the forward model can be a 1-dimensional, 2-dimensional or 3-dimensional model that is evoked on-the-fly within the minimization process, or it can be a pre-computed database. Here, N-dimensional refers to a model with material changes happening only in N of the 3 dimensions in a given coordinate system. For example, in a 1-dimensional model, material varies in only one of the dimensions and it is constant in the remaining two dimensions. A I-dimensional model is preferred over a 2- or 3-dimensional model since it is most often more computationally efficient to compute. A pre-computed database is typically much more efficient than any of the forward models, however it can be constructed in problems where dimension of the problem is low and the signal space does not have abrupt changes, which cannot be captured in the database within a reasonable database size. Especially in cases where the forward model will be used as part of an inversion, computational efficiency of the forward model dictates whether inversion can be applied in real time or not. The methods that are described here can allow faster convergence and consequently a real-time operation, which might not be possible otherwise. If a database is used, multi-dimensional interpolation may be used to compute the response corresponding to any given set of model parameters. In either case, the model that is used in the inversion process 118 is also used in the calibration process 106.

The embodiment in which the thickness and permeability of all tubular strings are solved for is known as unconstrained inversion. Alternatively, a constrained problem can be solved where only a subset of the model parameters are assumed to be unknown while others are assumed to have pre-known values. In cases where a sufficiently diverse set of independent measurements (multiple receivers and multiple frequencies) is available, unconstrained inversion yields a solution that best fits a measured response thanks to the increased number of degrees of freedom (model parameters). In other instances where not as many measurements are available or when the number of tubulars in the string are greater than a threshold (e.g., 4 tubulars or more), a constrained inversion is performed to reduce the number of unknowns. Some embodiments of constrained inversions are listed below:

1. Solve for the individual thickness of each tubular and an average permeability for all tubulars.
2. Solve for the individual thickness of each tubular and fix the permeability of all tubulars to the average value estimated from the calibration step.
3. Assume that defects exist on only one tubular at a time and solve the inverse problem several times for one unknown thickness at a time and compare the termination conditions. Select the solution with lowest misfit.

In the above embodiments, all unknowns were solved for simultaneously in one minimization process. This is referred to as joint inversion. Alternatively, multi-step inversion could be used. In a multi-step inversion, a first subset of model parameters are estimated using a first subset of measurements that are most sensitive to those parameters, while other parameters are assumed to be known. Then, the parameters that have been estimated in the first step are fixed and a second subset of parameters is estimated using a second subset of measurements.

An example embodiment of the inversion process 118 will now be given, where the inversion process 118 involves finding the optimum thickness and relative permeability of each tubular that minimizes the misfit between measurements and synthetic data generated using a forward model. A suitable parametric function (the cost function of block 120) is formed from the linear combination of a misfit term and a stabilizing term (also known as the regularization term), as given in Eq. (1) below. The misfit term is formed as the L2 norm squared of the weighted difference between calibrated measurements $W_{cal}m$ and data predicted by the synthetic model s(x). Meanwhile, the stabilizing term is formed as the L1 norm of the weighted difference between model parameters (thickness and relative permeability of each tubular) x and the nominal model parameters $x_{nom}$. This way, regularization penalizes large variations of thickness from nominal and helps mitigate non-uniqueness problems that may arise in cases involving large number of tubulars (e.g., 4 tubulars and more). In the example cost function of Eq. (1), the misfit term is normalized by the number of measurements 2M to make the cost function independent of the number of measurements.

$$F(x) = \frac{1}{2M}\left\|W_{m,abs} \times \left[\text{abs}\left\{\frac{s(x)}{W_{cal}m}\right\} - 1\right]\right\|_2^2 + \frac{1}{2M}\left\|W_{m,angle} \times \text{angle}\left\{\frac{s(x)}{W_{cal}m}\right\}\right\|_2^2 + |W_x + (x - x_{nom})|_1,$$

Equation (1)

where x is a vector of N unknowns (model parameters), such as $x=[t_1, \ldots, t_{N_p}, \mu_1, \ldots, \mu_{N_p}]$, where $N_p$ is the number of tubulars, m is a vector of M complex measurements at different frequencies and receivers. $M=N_{Rx} \times N_f$, where $N_{Rx}$ is the number of receivers and $N_f$ is the number of frequencies. For equation (1), s(x) is a vector of M forward model responses, and $W_{m,abs}$, $W_{m,angle}$ are measurement magnitude and phase weight matrices. M×M diagonal matrices may be used to assign different weights to different measurements based on the relative quality or importance of each measurement. Further, $W_{cal}$ is an M×M diagonal matrix of complex calibration constants, $W_x$ is an N×N diagonal matrix of regularization weights, and $x_{nom}$ is a vector of nominal model parameters. For N-dimensional vector y, $\|y\|_2^2 = \Sigma_{i=1}^N |y_i|^2$ and $|y|_1 = \Sigma_{i=1}^N |y_i|$. Also, note the division $$\frac{s(x)}{W_{cal}m}$$

is element-wise division.

L1 norm regularization as in Equation (1) equally penalizes deviations from the nominal whether these deviations are on a single tubular or on multiple tubulars. A solution with large defects on fewer tubulars as opposed to small defects on many tubulars can be favored by using the L0.5 norm instead on the L1 norm in the regularization term. Conversely, a solution with small defects on many tubulars as opposed to large defects on fewer tubulars can be favored by using the L2 norm.

The inverse problem is solved by finding the set of optimum model parameters $x_{opt}$ that minimizes the cost function, subject to constraints on the model parameters, as given in Eq. (2)

$$x_{opt} = \text{argmin}_x(F(x)), x_{lb} \leq x_{opt} \leq x_{ub},$$

Equation (2)

In at least some embodiments, model parameters are constrained to physical ranges to eliminate any non-physical results. For example, the thickness can range from zero to slightly larger than the nominal thickness (to account for defects and tubular variations around the nominal), and relative permeability can range from $\mu_{min}$ to $\mu_{max}$ with the limits chosen depending on the a priori knowledge of the type of steel of the tubulars used. Equation (2) describes a non-linear least square constrained optimization problem. It can be solved in many ways including gradient-based and non-gradient-based methods.

Optimum selection of receivers and frequencies to be used in the inversion process 118 depends on the number of tubulars in the casing string. For configurations comprising one or two tubulars, short spacing receivers and frequencies up to 10 Hz may be used to solve for all model parameters. For configurations comprising three tubulars or more, longer spacing receivers, and frequencies up to 8 Hz may be used to solve for the parameters of all tubulars. Frequency selection can be automated by computing the standard deviation of raw data and eliminating data points with standard deviation above certain pre-defined threshold. In the cost function, synthetic response is normalized to the measured response to put all measurements on equal footage. Relative importance of measurements (receivers/frequencies) can then be adjusted through the measurements weight matrices $W_{m,abs}$ and $W_{m,angle}$.

Regardless of the particular inversion process 118 employed in method 100, the results of method 100 provide thickness and/or relative permeability values for one or more tubular strings as a function of measured depth or position. These thickness or relative permeability values can be correlated with tubular defects such as corrosion. As desired, obtained thickness or relative permeability values are used to display a representation of any defects. For example, thickness or relative permeability logs showing any defects can be generated and displayed to a user. As desired, any defects determined using method 100 can be used to direct downhole operations such as adjusting valves or other flow control devices for one or more zones of a production well (e.g., well 70). Also, well intervention operations may be performed based on any defects determined using method 100.

Figure 5:
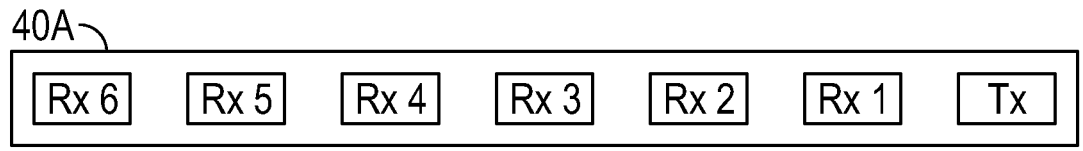
FIG. 5 is a block diagram of an illustrative defect detection tool.

Hereafter, an example EM defect detection scenario is presented. The scenario described is an example only and are not intended to limit EM defect detection to a particular EM defect detection tool or scenario. FIG. 5 is a block diagram of an illustrative EM defect detection tool 40A having a transmitter (Tx) and six spaced receivers (Rx1-Rx6). Although the EM defect detection tool 40A is represented in the EM defect detection scenarios given hereafter, it should be appreciated that EM defect detection tools may vary with regard to the number of transmitters, the number of receivers, the transmitter/receiver spacings, and the frequencies used. Collocated transmitter/receiver options are possible as well.

Figure 6A:
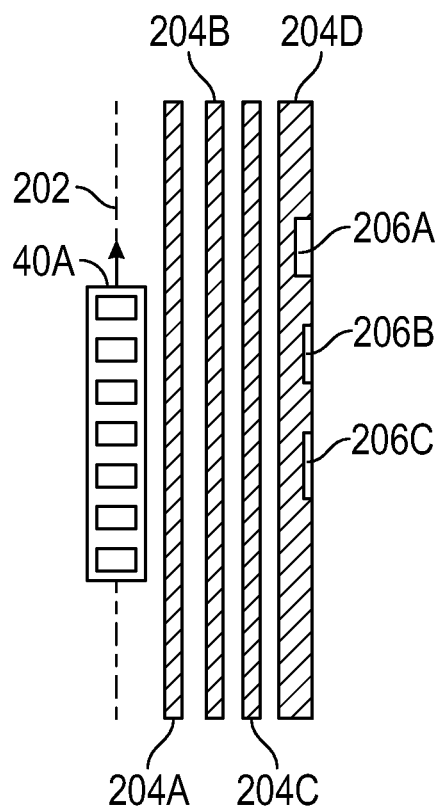
FIG. 6A is a diagram showing an example EM defect detection scenario.

FIG. 6A is a diagram showing an example EM defect detection scenario and related resolution-enhanced magnitude responses for different receivers. As shown in FIG. 6A, the example EM defect detection scenario corresponds to the EM defect detection tool 40A being deployed in a downhole environment with four tubular strings 204A-204D having different diameters (only a slice of the four tubular strings 204A-204D is shown). Parameters of the tubulars used in the example EM defect detection scenario are summarized in Table 1.

TABLE 1

| Tubular | 204A | 204B | 204C | 204D |
|---------|------|------|------|------|
| OD (inches) | 2.875 | 5 | 9.625 | 13.375 |
| Thickness (inches) | 0.217 | 0.625 | .545 | 0.514 |

TABLE 1-continued

| Tubular | 204A | 204B | 204C | 204D |
|---|---|---|---|---|
| Relative μ (estimate) | 62 | 60 | 58 | 82 |
| Length (feet) | 20 | 20 | 20 | 20 |
| Defect(s) | None | None | None | 0.09 inches × 2 feet, centered at 5 ft (17.5%) |
| | | | | 0.05 inches × 2 feet, centered at 9 ft (10%) |
| | | | | 0.03 inches × 2 feet, centered at 13 ft (6%) |

For the example EM defect detection scenario, thickness defects are present in the tubular string 204D. As the EM defect detection tool 40A moves axially along measurement path 202, raw measurements are collected by the EM detect detection tool 40A. For the example given, the transmitter has a core with relative permeability of 200, conductivity of 0.01 S/m, and outer diameter of 0.8 in. The receivers for the example EM defect detection scenario are without a core, and measurements are collected at frequencies of 0.5 Hz, 1 Hz, 2 Hz, 3 Hz, 4 Hz, and 5 Hz.

Figure 6B:
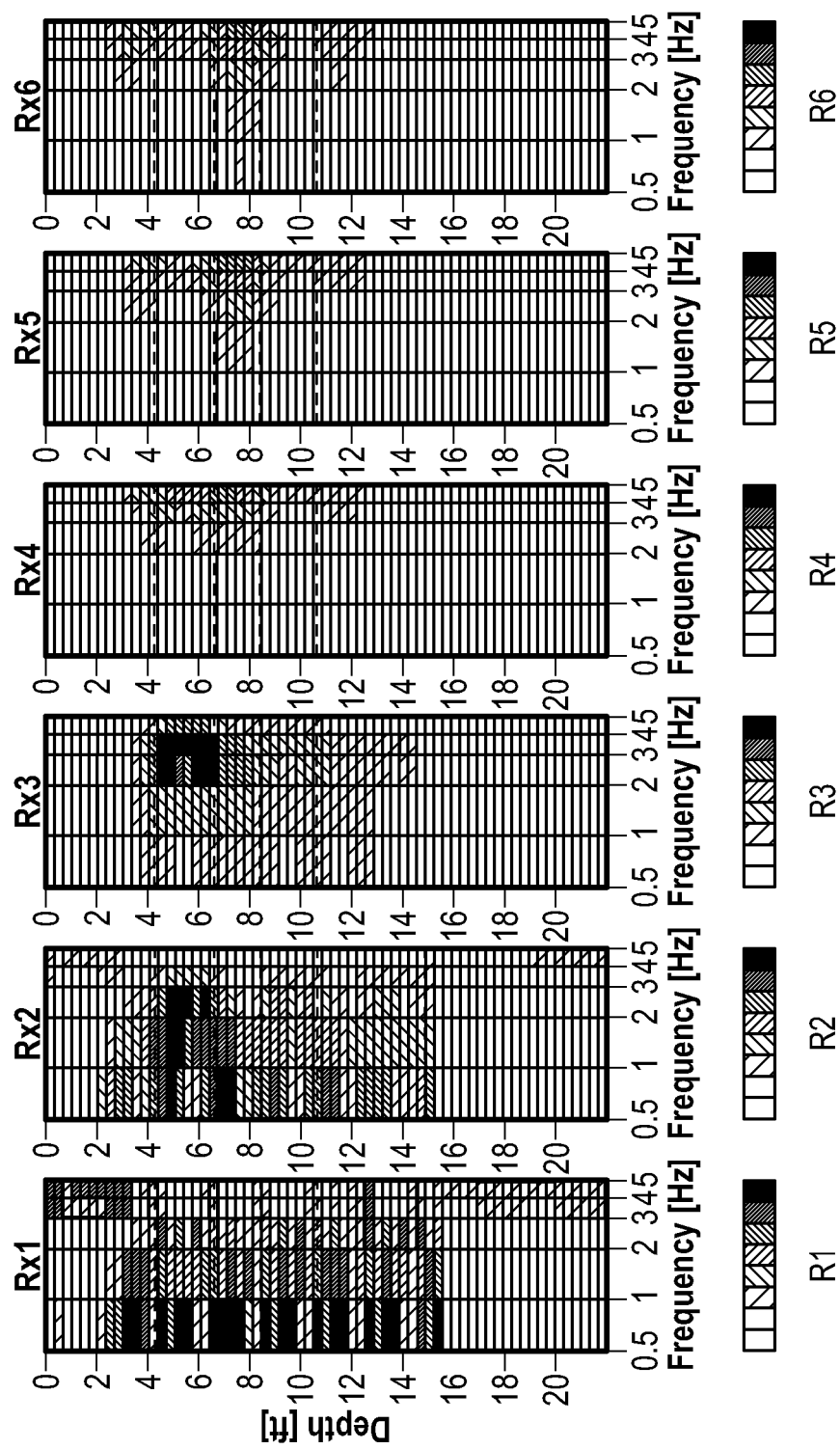
FIG. 6B is a diagram showing resolution-enhanced magnitude responses for different receivers in the example EM defect detection scenario.
Figure 7:
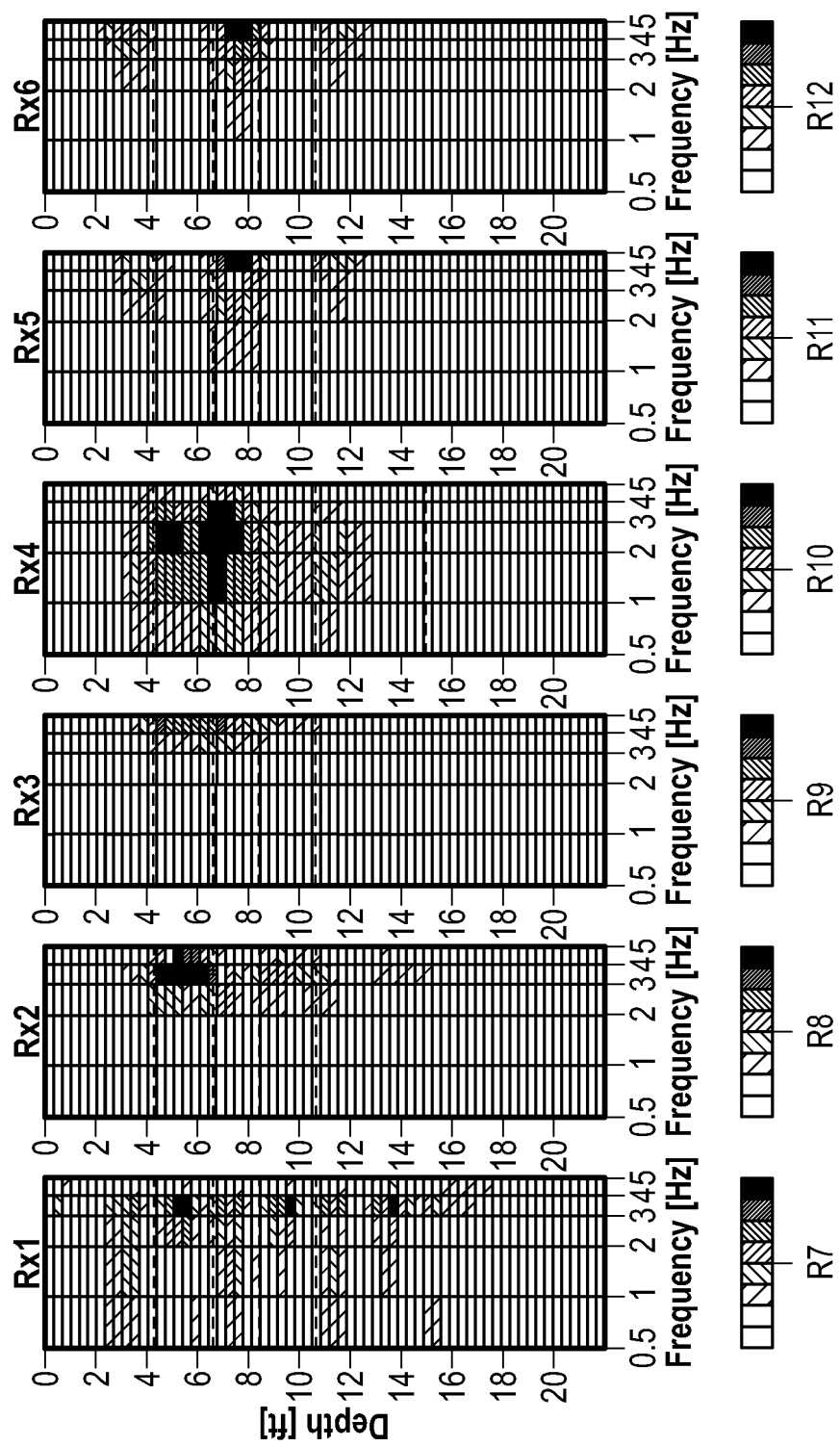
FIG. 7 is a diagram showing resolution-enhanced phase responses for different receivers in the example EM defect detection scenario.

An R1D model is used to process measurements corresponding to the example EM defect detection scenario inversion. First, raw measurements are calibrated to match the synthetic response (e.g., using calibration process 106 of FIG. 4). Then resolution enhancement operations (e.g., block 112 of FIG. 4) are applied to the calibrated measurements to improve vertical resolution and remove ghost effect. Resolution-enhanced magnitude responses for different receivers and frequencies of the example EM defect detection scenario are shown in FIG. 6B. Meanwhile, resolution-enhanced phase responses for different receivers and frequencies of the example EM defect detection scenario are shown in FIG. 7.

Figure 8A:
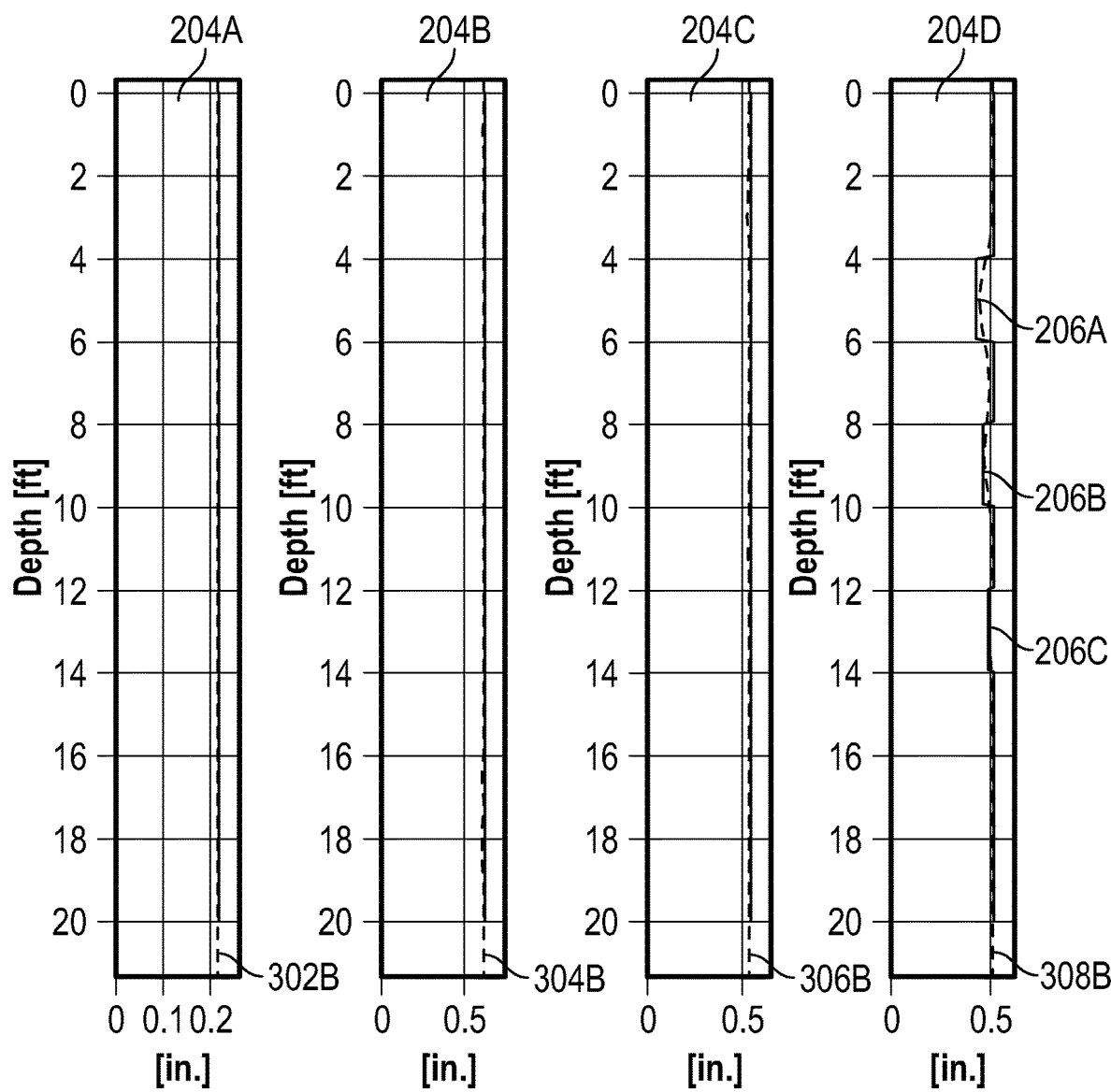
FIGS. 8A and 8B are diagrams showing actual defects, predicted defects, and a misfit log for the example EM defect detection scenario.
Figure 8B:
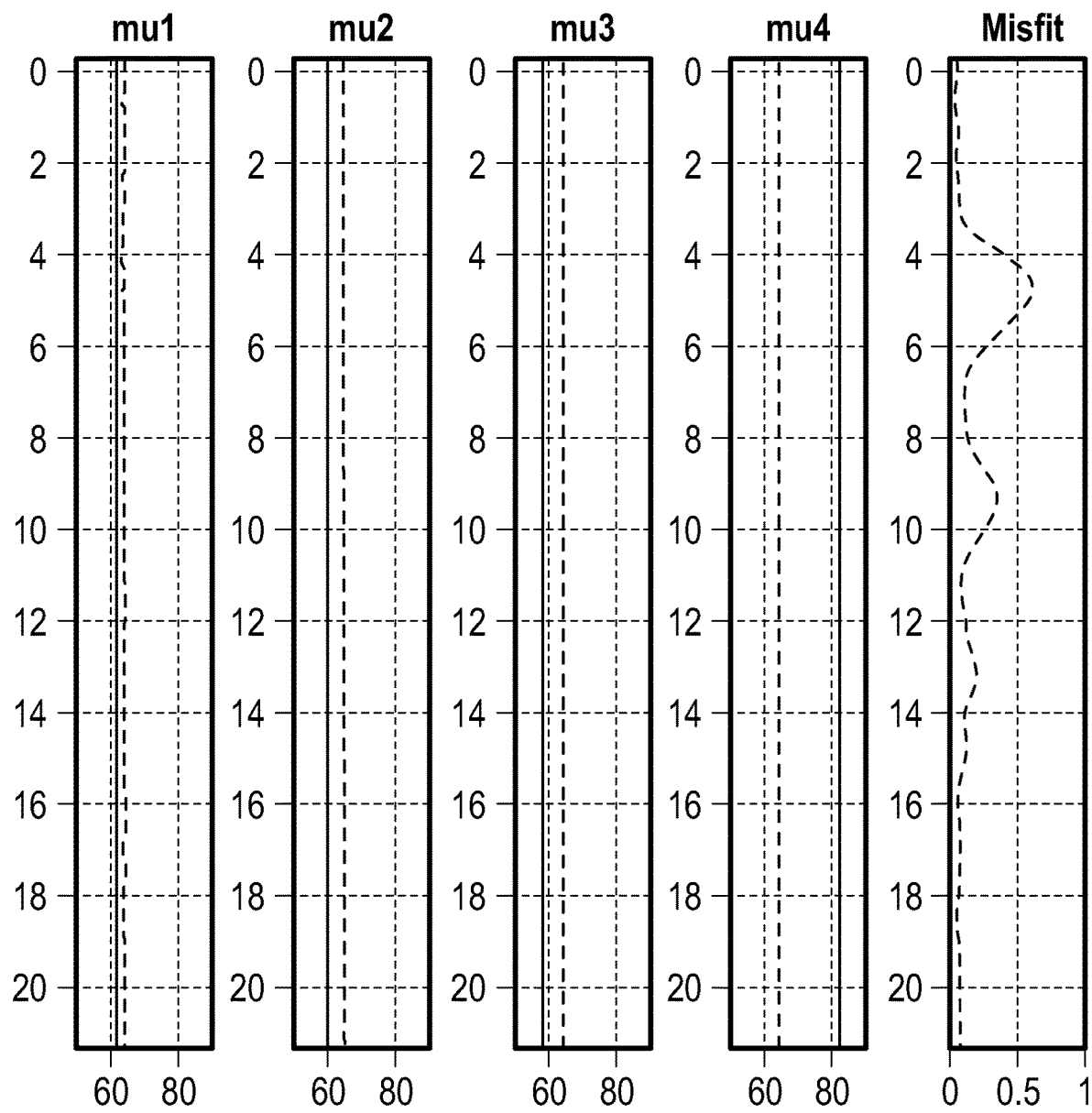
Figures 9A, 9B, 9C, 9D, 9E:
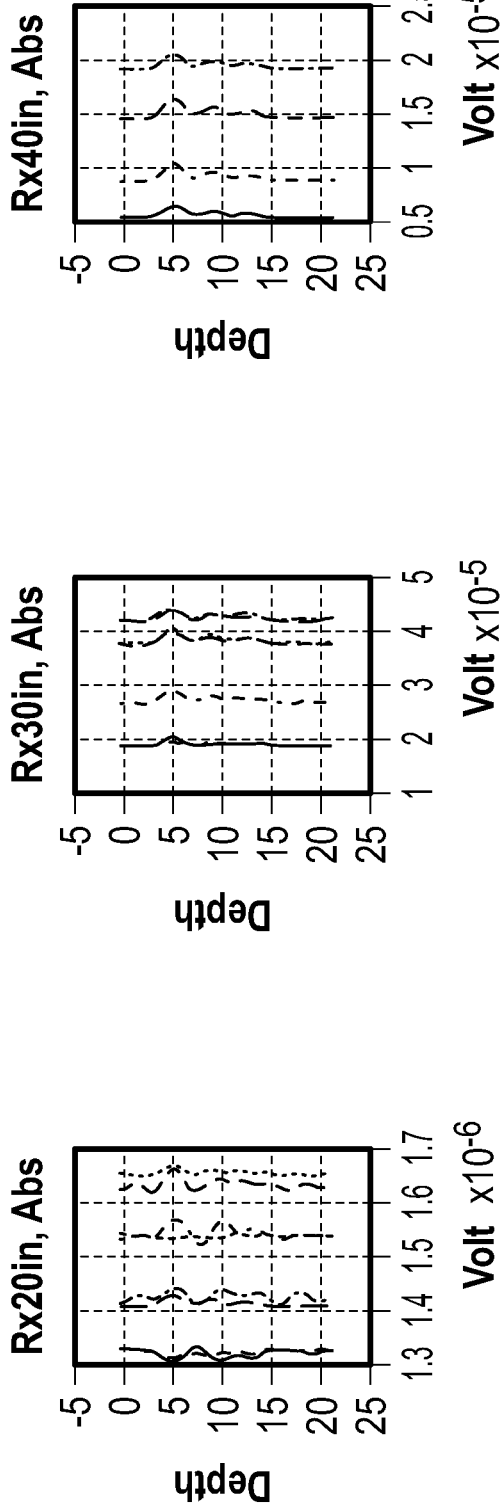

In the example EM defect detection scenario, inversion (e.g., inversion process 118 of FIG. 4) is applied to the resolution-enhanced responses. Example inversion results are shown in FIGS. 8A and 8B. In this example, inversion is used to solve for the thickness of each tubular and an average permeability for all tubulars. As shown in FIG. 8A, inversion results for tubular thickness capture the depth and thickness of the defects on outer tubular 204l while estimating the thickness of non-defected inner tubulars (tubulars 204A-204C) reasonably well. Meanwhile, inversion results for relative permeability are represented in FIG. 8B. The value of the cost function F(x) at convergence is also represented in FIG. 8B. The high misfit that shows up at the defects is probably due to the mismatch between R1D model used in inversion and the measured response corresponding to two-dimensional defects.

To assess the quality of convergence, responses corresponding to the inverted parameters were reconstructed using an R1D model and were compared with the measured responses. FIGS. 9A-9J show illustrative measured versus reconstructed response charts for different receivers in the example EM defect detection scenario. In general, a good fit is observed or the different receivers and frequencies.

While the first inversion option has been described using frequency-domain analysis, it should be appreciated that the first inversion option can be performed using time-domain analysis. For time-domain analysis, time-domain measurements are used instead of frequency-domain measurements in all of the above formulas and workflows. In fact, due to strong dispersive nature of the problem, there is an approximate relationship between frequency domain and time domain measurements associated with the same coils and tubulars. In other words, V_time(l/f) is proportional to V_frequency(f), where V_time(t) is the time domain measurement corresponding to time t, and V_frequency(f) is the frequency domain measurement corresponding to frequency f.

For time-domain analysis, the cost function can be written as $$F(x) = \frac{1}{M}\left\|W_m \times \left[\frac{s(x)}{W_{cal}m} - 1\right]\right\|_2^2 + |W_x \times (x - x_{nom})|_1, \quad \text{Equation (3)}$$

where x is vector of N unknowns (model parameters), such as $x=[t_1, \ldots, t_{N_p}, \mu_1, \ldots, \mu_{N_p}]$, where $N_p$ is the number of tubulars, in is a vector of M real-valued measurements at different time slots and receivers. $M=N_{Rx} \times N_{TS}$, where $N_{Rx}$ is the number of receivers and $N_{TS}$ is the number of time slots in the decay response. In equation (3), s( ) is a vector of M forward model responses and $W_m$ is a measurement weight matrix (e.g., an M×M diagonal matrix). $W_{cal}$ is a M×M diagonal matrix of real-valued calibration constants, $W_x$ is a N×N diagonal matrix of regularization weights, and $x_{nom}$ is a vector of nominal model parameters.

Much of the foregoing discussion has been directed to a first inversion option involving a cost function. Additionally or alternatively, a second inversion option involving prior defect test results or a model obtained from prior defect test results can be employed. For the second inversion option, the defect test results are obtained by collecting measurements involving known defects and test scenarios. With the second inversion option, there is no need for a physics-based model to accurately estimate metal loss due to corrosion in multi-tubular completion configurations. For the second inversion option, rules may be established to select which measurements will be used to drive the inversion model. In other words, the rules will identify which of the available receiver voltages (magnitude and phase, at different spacings and frequencies) are the most sensitive to metal loss (the target parameter) while at the same time being fairly insensitive to parameters that are not targeted for estimation, like tubular variability in permeability, eccentricity, electrical noise, etc.

Figure 10:
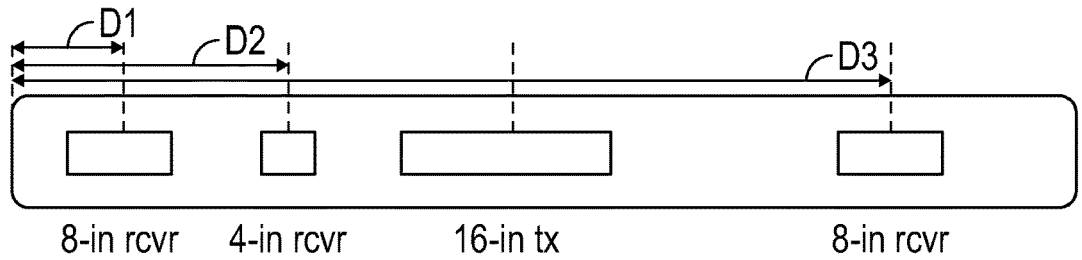
FIG. 10 is a block diagram of an illustrative EM defect detection tool used to obtain defect test results related to a second inversion process.
Figure 11A:
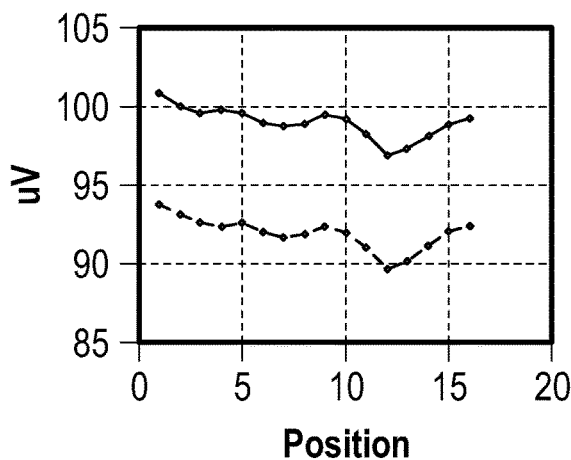
FIGS. 11A-11D are diagrams showing magnitude and phase responses for a particular test receiver and frequency.
Figure 11B:
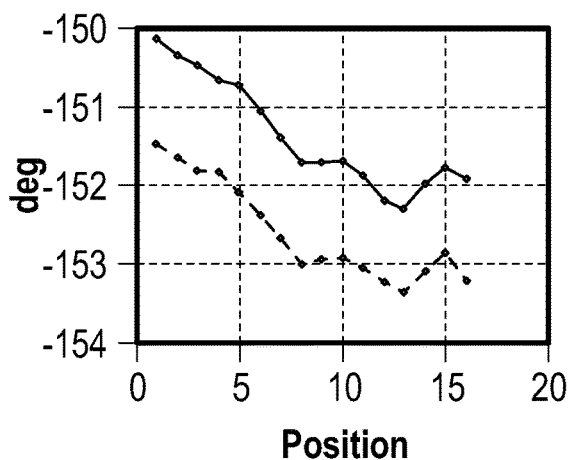
Figure 11C:
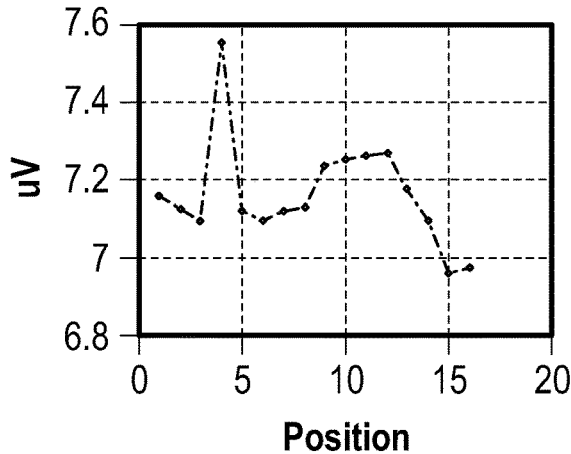
Figure 11D:
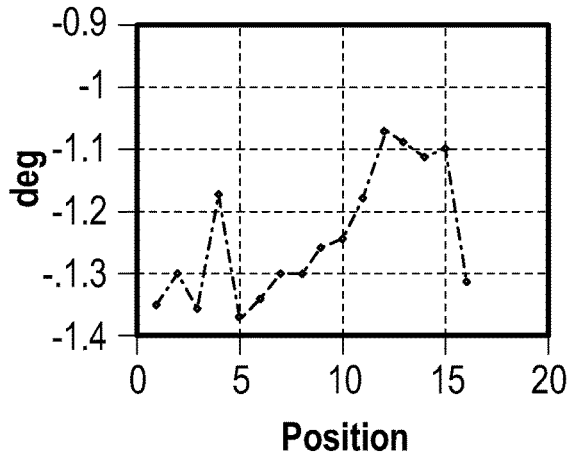

Provided hereafter is a simple embodiment example of the second inversion option, based on experimental results. For the experiment, metal gain is detected rather than metal loss. However, the results of the experiment are fully applicable to metal loss. FIG. 10 shows an EM defect detection tool used for the experiment. As shown, the tool includes 3 receiver (Rx) coils placed at 3 different spacings, and 1 transmitter (Tx) coil. During the experiment, the transmitter excites tubulars (not shown) in the vicinity of the EM defect detection tool using different frequencies—for example: 0.5 Hz, 1 Hz, 2 Hz, 3 Hz, . . . , 50 Hz. Using a QAM filtering technique, the magnitude and phase of the voltages measured at each Rx and frequency are measured.

More specifically, for the experiment, the EM defect detection tool is used to collect data in a multi-tubular configuration having four tubulars with outer diameters equal to: 2⅞", 5", 9⅝", and 13⅜", with a total metal thickness=1.9". During the experiment, data is collected using two different tests to determine the effect of metal gain on the collected measurements. For the first test, measurements are collected without metal gain (no collar is used). For the second test, measurements are collected with metal gain by adding an outer ring (collar) to simulate a metal gain in the outer tubular. The collar is assumed to have an outer diameter of 16", thickness of 0.55', and length of 1 foot.

Figures 13M, 13N:
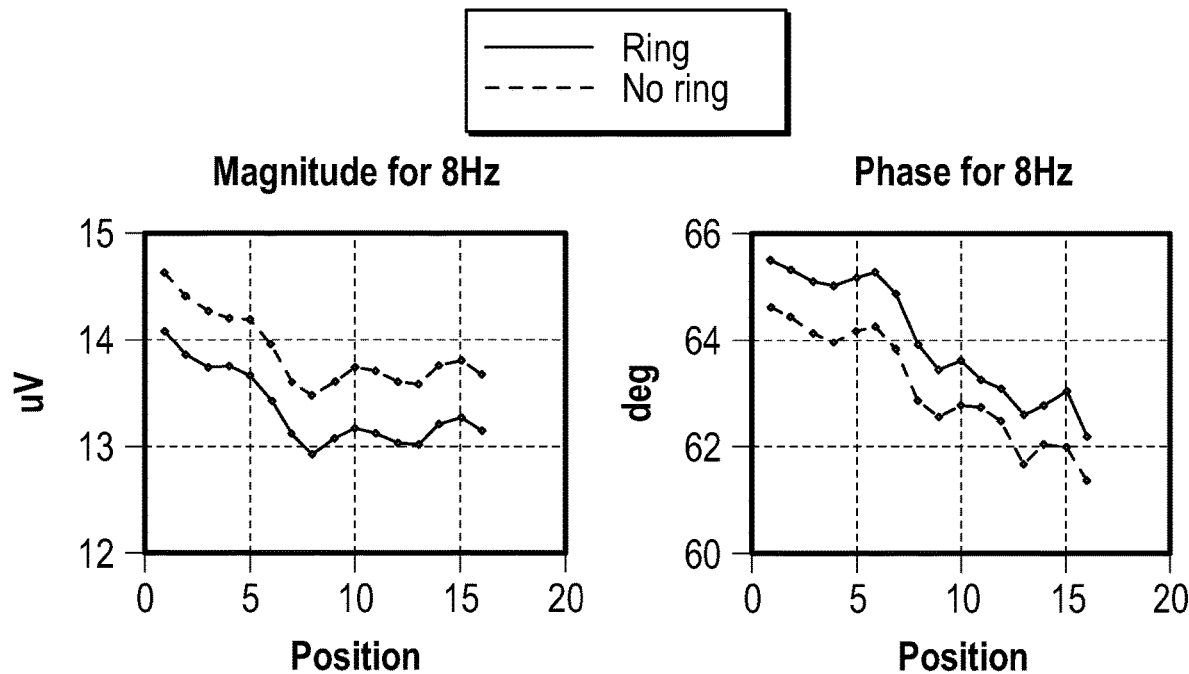
FIGS. 13A-13P are diagrams showing magnitude and phase responses for the same test receiver and different frequencies.
Figures 13O, 13P:
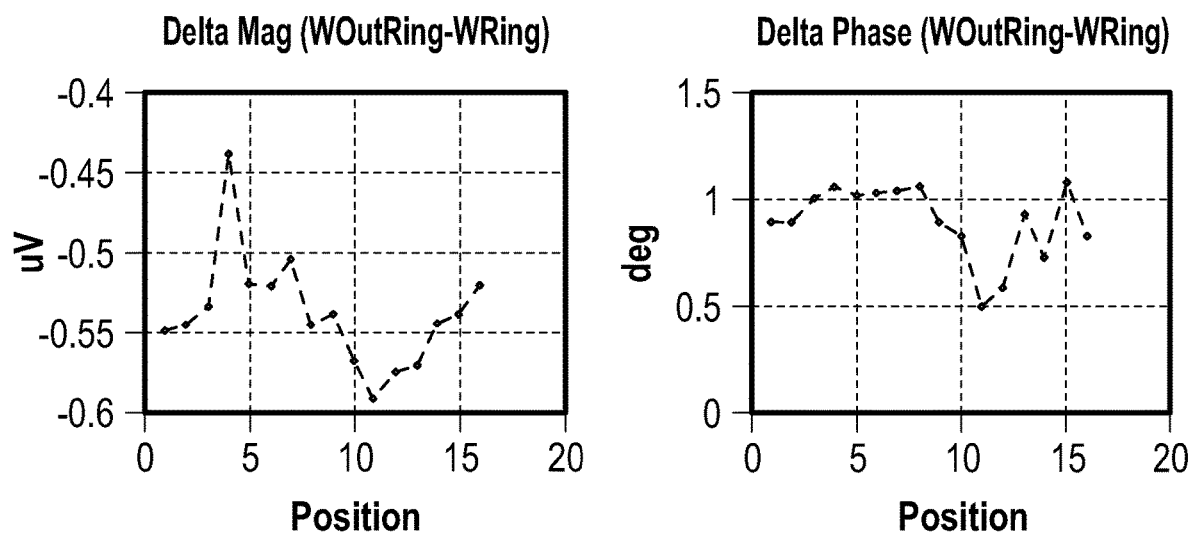

FIGS. 11A-11D are diagrams showing magnitude and phase responses for a particular test receiver (a receiver at an 8" spacing from the transmitter) and frequency (2 Hz). Meanwhile. FIGS. 12A-12D are diagrams showing magnitude and phase responses for the same test receiver and another frequency (4 Hz). FIGS. 13A-13P are diagrams showing magnitude and phase responses for the same test receiver and different frequencies (4 Hz, 5 Hz, 6 Hz, and 10 Hz).

To summarize, the test results represented in FIGS. 11A-11D, 12A-12D, and 13A-13P indicate that only some of the collected measurements will be good indicators of metal thickness change in a given tubular. Accordingly, for a EM defect detection tool with multiple spacings (multiple RX coils) and multiple transmitted frequencies, only some of the available measurements are good indicators of metal loss for a given tubular. Accordingly, in at least some embodiments, the second inversion option is based on measurements that were previously identified as being good indicators of metal loss, considering the particular completion (tubular OD and thickness) of the well under analysis.

For a measurement to be a good indicator of metal loss, two conditions need to be fulfilled. First, the signal change due to metal loss in the tubular of interest has to be "measurable" (e.g., change in voltage magnitude need to be in the order of micro-Volts or larger, and phase changes in the order of at least a few degrees). Second, the signal change due to metal loss has to be larger than signal change due to non-target factors that can't be controlled (e.g., tubular variability due to magnetic permeability, magnetization, minor irregularities eccentricity, or other attributes).

In at least some embodiments, the second inversion option can be based on a regression approach to determine an appropriate model. Example techniques to compute an appropriate model from available data include ARMAX, Linear Regression, Neural Nets, and many other Machine Learning techniques. Linear regression is simple and gives good results for this example. In one embodiment example, the voltage magnitude at 2 Hz (denoted Mag2H-t) and the Voltage phase at 4 Hz (denoted Ph4 Hz) may be used in a thickness change estimator given as:

$$\Delta \text{Metal} = C1 * \Delta \text{Mag2 Hz} + C2 * \Delta \text{Ph4 Hz},$$

where ΔMetal is the estimated metal gain (Δ is the change with respect to response obtained for nominal thickness). ΔMag2 Hz is the measured change in signal Magnitude at 2 Hz. ΔPh4 Hz is the measured change in signal Phase at 4 Hz, and C1 and C2 are coefficients (obtained, for example, via Least Squares fit of design data).

The experimental data available to design and test the thickness change estimator includes a total of 32 cases; 16 cases at different "depths" (positions) along the tubular with no metal gain (no ring or collar), and another 16 cases which correspond to 16 depths with a metal gain of 0.55" (ring placed on outer tubular). In at least some embodiments, the available data is partitioned into a design subset (to be used to come up with model parameters C1, C2) and a testing subset (to be used to validate the model). Next, the accuracy of the thickness change estimator in predicting metal change is discussed for two different data partitions, Case A and Case B.

Figure 14A:
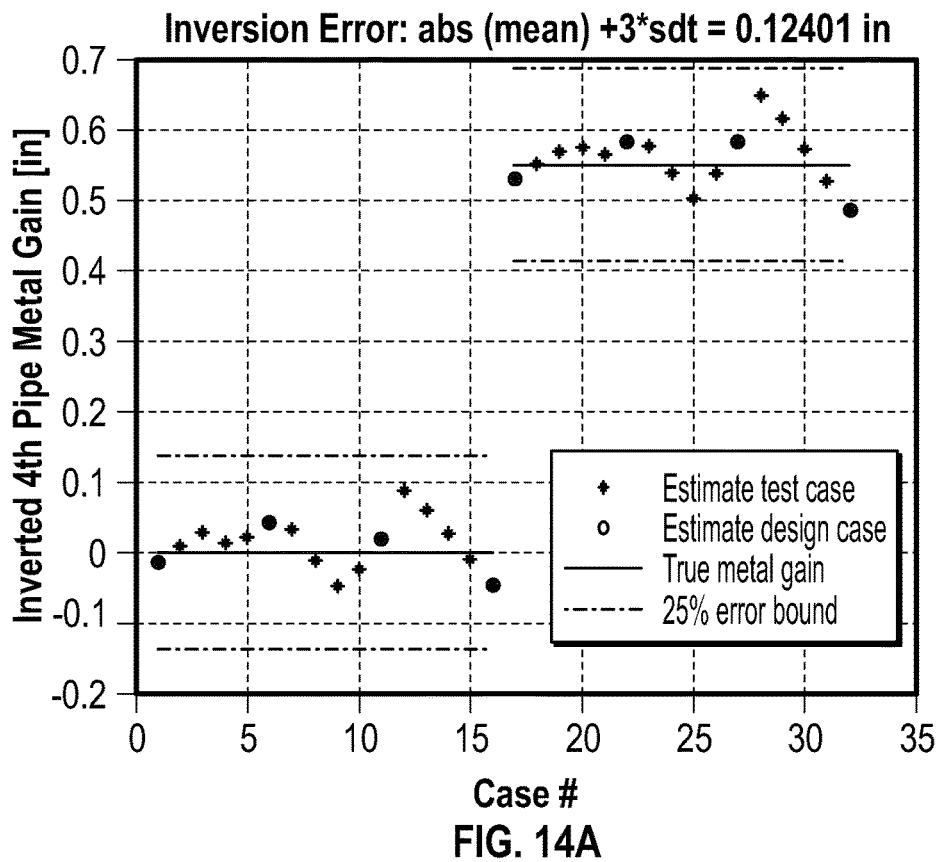
FIGS. 14A and 14B are diagrams showing design versus test data points related to an example defect estimator.
Figure 14B:
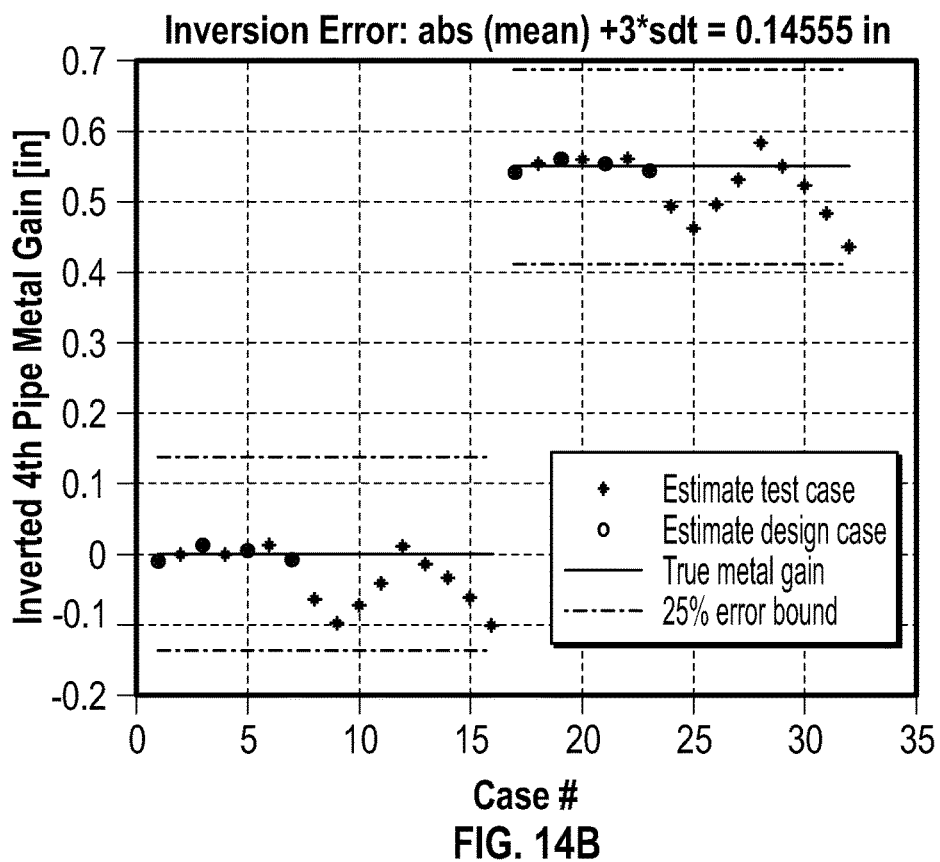

For Case A, the design subset includes 8 scenarios, 4 with and 4 without metal gain, distributed along the tubular. The testing subset is chosen as the total number of cases available (e.g., all 32 scenarios, including the 8 scenarios used for design). The Case A results are represented in FIG. 14A. The Case B results are represented in FIG. 14B, and show the model prediction capabilities. For Case B, the scenarios are sorted such that first 16 of them correspond to metal gain=0" in ascending depth, while the remaining 16 correspond to gain=0.55" also in ascending depth. Allowed error is shown with dashed lines, true metal gain is with solid lines, training points are shown with circles, and testing scenarios are indicated with asterisks. For Case B, the design subset includes 8 scenarios, 4 with and 4 without metal gain, but now only covering the left half of the tubular. The testing subset is chosen as in Case A.

It can be observed that, in both Cases A and B, estimated metal gains remain within the error bounds of, as an example, 25% (or 0.25*0.55=0.14"). As expected, training cases show lower estimation error than testing cases (not used for training). The above example shows the feasibility of the second inversion option for an outer tubular defect at the accuracy level required in the presence of practical tubular variability. Further testing to cover all possible scenarios (all tubular size combinations with defects in any tubular) would require collecting data from a large number of experiments. Alternatively, a model can be developed to synthesize/interpolate most of the experimental data required.

The second inversion option described herein can be employed independently from the first inversion option. Alternatively, the results of the second inversion option can be combined with the results of the first inversion option. For example, combined results of the first and second inversion processes can be used to determine a defect in one or more downhole tubular strings. When combined, the results of the different inversion options cal be weighted the same or can be weighted differently. Additionally or alternatively, a confidence value for results of the first inversion process can be determined based on results of the second inversion process or vice versa. A representation of any defects as well as any related confidence values can be displayed by an output de ice to a user.

Figure 15:
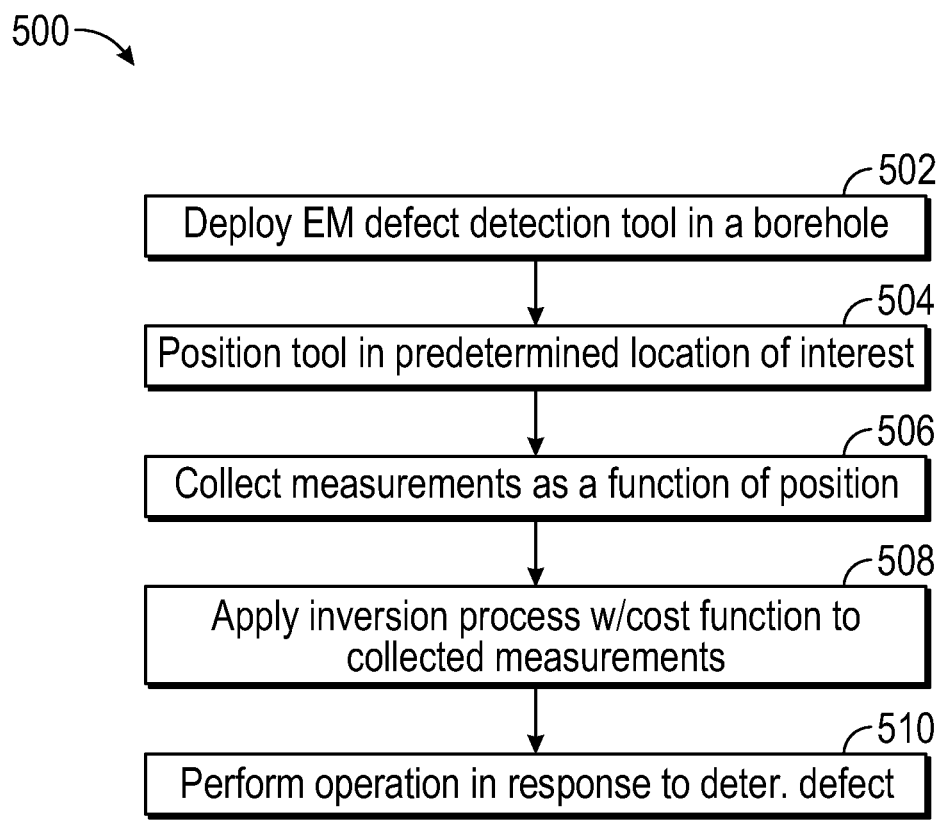
FIG. 15 is a flowchart showing an illustrative method for EM defect detection.

FIG. 15 is a flowchart showing an illustrative method 500 for EM defect detection. At block 502, an EM defect detection tool is deployed in a borehole having one or more tubular strings. At block 504, the tool is placed in a predetermined location of interest in the borehole. At block 506, the tool is used to collect measurements by the EM defect detection tool at different points along the borehole. At block 508, the collected measurements undergo a first inversion process to determine defects in one or more tubular strings, where the first inversion process involves a cost function having a misfit term and having a stabilizing term with nominal model parameters. At block 510, an operation is performed in response to the determined defect or related values. The operation may be, but is not limited to, displaying, printing, modifying procedures, or altering operations in response to the defect or related values. In at least some embodiments, the method 500 may include additional steps involving the second inversion option as described herein.

Embodiments disclosed herein include:

A. A method that includes deploying an electromagnetic (EM) defect detection tool in a borehole having one or more tubular strings, collecting measurements by the EM defect detection tool at different points along the borehole, using the collected measurements and a first inversion process to determine a defect in one or more tubular strings, where the first inversion process involves a cost function having a misfit term and having a stabilizing term with nominal model parameters, and performing an operation in response to the determined defect.

B. A system that includes an EM defect detection tool deployed in a borehole having one or more tubular strings to collect measurements at different points along the borehole, a processing unit that uses the collected measurements and a first inversion process to determine a defect in one or more tubular strings, where the first inversion process involves a cost function having a misfit term and having a stabilizing term with nominal model parameters, and a device that performs an operation in response to the determine defect.

Each of embodiments A and B may have one or more of the following additional elements in any combination: Element 1: wherein the cost function comprises a linear combination of the misfit term and the stabilizing term. Element 2: wherein the misfit term comprises a weighted difference between a calibrated version of the collected measurements and predicted measurements. Element 3: wherein the stabilizing term comprises a weighted difference between model parameters and nominal model parameters. Element 4: wherein the stabilizing term comprises an L0.5, L1, or L2 norm of the weighted difference between model parameters and nominal model parameters. Element 5: wherein a scaling factor is applied to the L0.5, L1, or L2 norm of the weighted difference between model parameters and nominal model parameters. Element 6: herein the first inversion process minimizes the cost function subject to constraints for tubular thickness and relative permeability. Element 7: wherein the first inversion process comprises RID processing. Element 8: further comprising comparing results of the first inversion process with results of a second inversion process, wherein the second inversion process uses the collected measurements as well as prior defect test results or a model obtained from prior defect test results to estimate a defect in the one or more tubular strings. Element 9: further comprising combining results of the first and second inversion processes to determine a defect in the one or more tubular strings. Element 10: further comprising determining a confidence value for results of the first inversion process based on results of the second inversion process.

Element 11: wherein the cost function comprises a linear combination of the misfit term and the stabilizing term, wherein the misfit term comprises a weighted difference between a calibrated version of the collected measurements and predicted measurements, and wherein the stabilizing term comprises a weighted difference between model parameters and nominal model parameters. Element 12: wherein the stabilizing term comprises an L0.5, L1, or L2 norm of the weighted difference between model parameters and nominal model parameters. Element 13: wherein a scaling factor is applied to the L0.5, L1, or L2 norm of the weighted difference between model parameters and nominal model parameters. Element 14: wherein the first inversion process minimizes the cost function subject to constraints for tubular thickness and relative permeability. Element 15: wherein the first inversion process comprises RID processing. Element 16: wherein the processing unit compares results of the first inversion process with results of a second inversion process, wherein the second inversion process uses the collected measurements as well as prior defect test results or a model obtained from prior defect test results to estimate a defect in one or more tubular strings. Element 17: herein the processing unit combines results of the first and second inversion processes to determine and display a defect in the one or more tubular strings. Element 18: wherein the processing unit determines and displays a confidence value for results of the first inversion process based on results of the second inversion process.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method that comprises:
    deploying an electromagnetic (EM) defect detection tool in a borehole having one or more tubular strings;
    collecting measurements by the EM defect detection tool at different points along the borehole;
    using the collected measurements and a first inversion process to determine a defect in the one or more tubular strings, wherein the first inversion process comprises a radial one-dimensional model, wherein the radial one-dimensional model inputs are one or more of a magnetic permeability and a thickness of the tubulars, and wherein the first inversion process involves a cost function having a misfit term and a stabilizing term with nominal model parameters; and
    checking the convergence of the inversion by comparing one or more of the measured responses to one or more responses predicted by the radial one-dimensional model.

2. The method of claim 1, wherein the cost function comprises a linear combination of the misfit term and the stabilizing term.

3. The method of claim 1, wherein the misfit term comprises a weighted difference between a calibrated version of the collected measurements and predicted measurements.

4. The method of claim 1, wherein the stabilizing term comprises a weighted difference between model parameters and nominal model parameters.

5. The method of claim 4, wherein the stabilizing term comprises an L0.5, L1, or L2 norm of said weighted difference between model parameters and nominal model parameters.

6. The method of claim 5, wherein a scaling factor is applied to the L0.5, L1, or L2 norm of said weighted difference between model parameters and nominal model parameters.

7. The method of claim 1, wherein the first inversion process minimizes the cost function subject to constraints for tubular thickness and relative permeability.

8. The method of claim 1, further comprising comparing results of the first inversion process with results of a second inversion process, wherein the second inversion process uses the collected measurements as well as prior defect test results or a model obtained from prior defect test results.

9. The method of claim 8, further comprising combining results of the first and second inversion processes.

10. The method of claim 8, further comprising determining a confidence value for results of the first inversion process based on results of the second inversion process.

11. A system that comprises:
    an electromagnetic (EM) defect detection tool deployed in a borehole having one or more tubular strings to collect measurements at different points along the borehole; and
    a processing unit that uses the collected measurements and a first inversion process comprises a radial one-dimensional model, wherein the radial one-dimensional model inputs are one or more of a magnetic permeability and a thickness of the tubulars to determine a defect in the one or more tubular strings, wherein the first inversion process involves a cost function having a misfit term and a stabilizing term with nominal model parameters, and checks the convergence of the inversion by comparing one or more of the measured responses to one or more responses predicted by the radial one-dimensional model.

12. The system of claim 11, wherein the cost function comprises a linear combination of the misfit term and the stabilizing term, wherein the misfit term comprises a weighted difference between a calibrated version of the collected measurements and predicted measurements, and wherein the stabilizing term comprises a weighted difference between model parameters and nominal model parameters.

13. The system of claim 12, wherein the stabilizing term comprises an L0.5, L1, or L2 norm of said weighted difference between model parameters and nominal model parameters.

14. The system of claim 13, wherein a scaling factor is applied to the L0.5, L1, or L2 norm of said weighted difference between model parameters and nominal model parameters.

15. The system of claim 11, wherein the first inversion process minimizes the cost function subject to constraints for tubular thickness and relative permeability.

16. The system of claim 11, wherein the processing unit compares results of the first inversion process with results of a second inversion process, wherein the second inversion process uses the collected measurements as well as prior defect test results or a model obtained from prior defect test results.

17. The system of claim 16, wherein the processing unit combines results of the first and second inversion processes.

18. The system of claim 16, wherein the processing unit determines and displays a confidence value for results of the first inversion process based on results of the second inversion process.

* * * * *